United States Patent
Hiroyasu et al.

(10) Patent No.: US 6,663,326 B1
(45) Date of Patent: Dec. 16, 2003

(54) CUTTING TIP AND MANUFACTURING METHOD THEREOF

(75) Inventors: Minoru Hiroyasu, Sayama (JP);
Satomi Isibasi, Sayama (JP);
Masatomi Ito, Sayama (JP); Hiroyuki Nomura, Sayama (JP); Shigemitsu Nomura, Sayama (JP); Hiroyuki Fukushima, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/577,999

(22) Filed: May 24, 2000

(30) Foreign Application Priority Data

| May 31, 1999 | (JP) | 11-152585 |
| May 31, 1999 | (JP) | 11-152595 |
| May 24, 1999 | (JP) | 11-143641 |
| May 24, 1999 | (JP) | 11-143677 |
| May 24, 1999 | (JP) | 11-143688 |
| May 24, 1999 | (JP) | 11-143727 |
| Oct. 1, 1999 | (JP) | 11-282135 |
| Oct. 13, 1999 | (JP) | 11-291676 |
| Jan. 12, 2000 | (JP) | 2000-003925 |

(51) Int. Cl.$^7$ ............................................. B23B 51/02
(52) U.S. Cl. .................. 408/144; 407/29; 407/118; 408/145; 408/59; 408/222; 408/230; 408/24; 409/74; 470/198
(58) Field of Search ................. 408/144, 145, 408/222, 57, 59, 227, 229, 230, 24, 30; 407/29, 118; 409/74, 75, 76; 470/198, 204

(56) References Cited

U.S. PATENT DOCUMENTS

| 2,817,983 A | * 12/1957 | Mossberg | 408/144 |
| 3,085,453 A | * 4/1963 | Mossberg | 408/144 |
| 4,125,057 A | 11/1978 | Cox | |
| 4,627,503 A | 12/1986 | Horton | |
| 4,713,286 A | * 12/1987 | Bunting et al. | 428/323 |
| 4,762,445 A | * 8/1988 | Bunting et al. | 408/144 |
| 5,129,188 A | * 7/1992 | Alverio | 51/288 |
| 5,143,492 A | 9/1992 | Leeb | |
| 5,316,520 A | * 5/1994 | Green | 470/198 |
| 5,429,459 A | * 7/1995 | Palm | 409/66 |
| 5,443,337 A | 8/1995 | Katayama | |
| 5,580,196 A | * 12/1996 | Thompson | 408/145 |
| 5,733,078 A | * 3/1998 | Matsushita et al. | 409/74 |
| 6,132,148 A | * 10/2000 | Thompson | 408/144 |
| 2001/0054332 A1 | * 12/2001 | De Beaupre | 76/108.1 |

FOREIGN PATENT DOCUMENTS

| EP | 0 488 623 | 6/1992 | |
| EP | 0 714 719 | 6/1996 | |
| EP | 0 899 044 | 3/1999 | |
| FR | 2654663 A | * 5/1991 | 408/145 |
| JP | 64701 A | * 3/1989 | 408/145 |
| JP | 3-117520 | 3/1990 | |
| JP | 5-63717 | 1/1992 | |

OTHER PUBLICATIONS

Search Report under Section 17(5) dated Jan. 15, 2001.

* cited by examiner

*Primary Examiner*—Daniel W. Howell
(74) *Attorney, Agent, or Firm*—Merchant & Gould, P.C.

(57) ABSTRACT

A cutting tip having a three-layer laminated structure is provided. The tip is made from a disc-shaped three-layer laminate wherein a second layer consisting of a hard sintered compact of CBN or diamond is sandwiched by a first layer and a third layer consisting of a tool material such as cemented carbide. Prismatic blanks of rectangular cross-section are cut out by cutting the three-layer laminate in strips. Semi-completed tips of a desired shape are obtained by cutting up the prismatic blanks. Desired cutting edges are formed on the semi-completed tips to produce completed tips. Because prismatic blanks are obtained from a three-layer laminate and semi-completed tips are cut out from the prismatic blanks like this, the semi-completed tips can be obtained in large numbers, yield is high, and the manufacturing cost of the tip can be reduced.

10 Claims, 43 Drawing Sheets

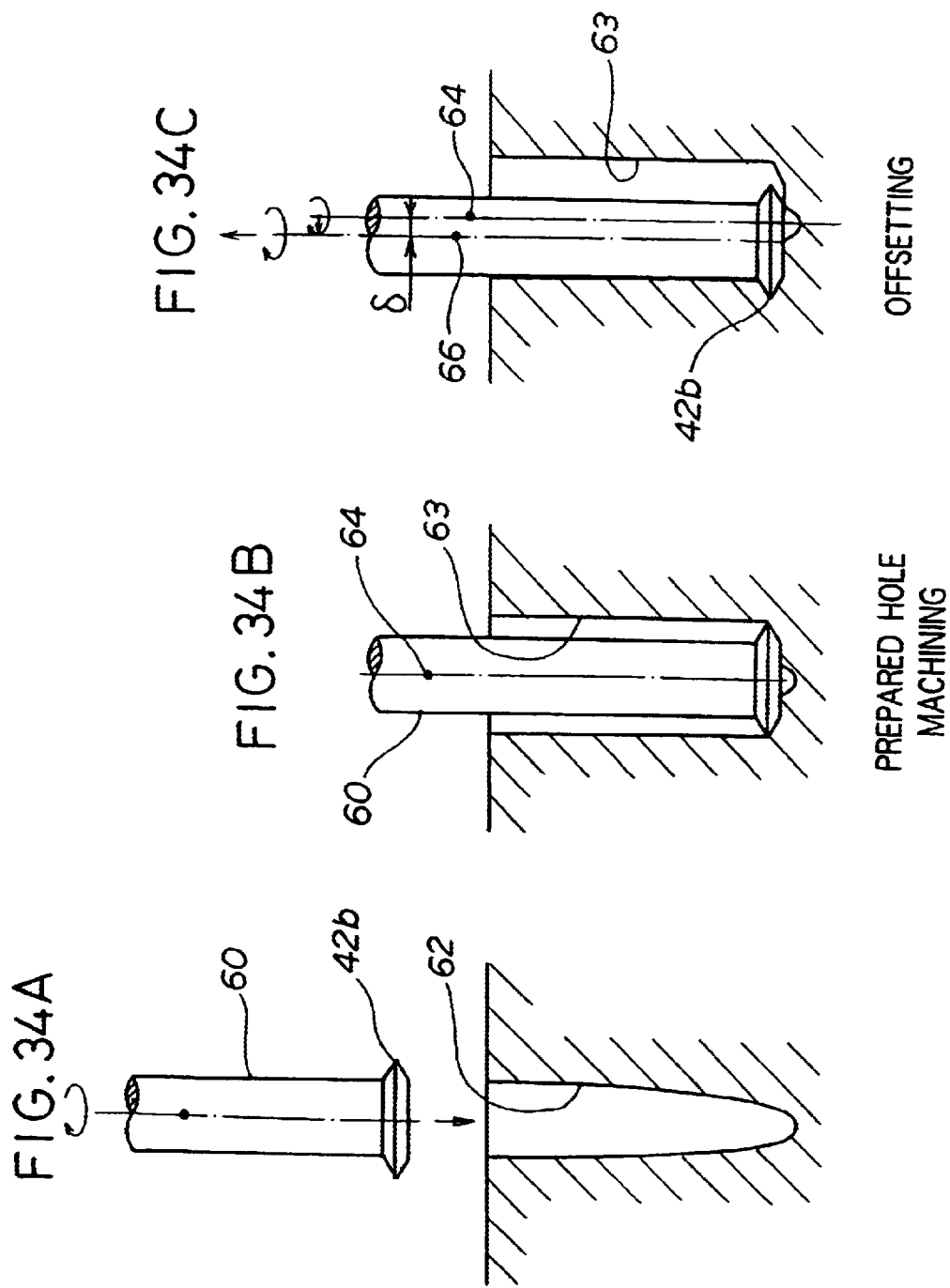

THREAD CUTTING FINISHED

CHAMFERING

THREAD CUTTING

COMPARATIVE EXAMPLE

PREFERRED EMBODIMENT

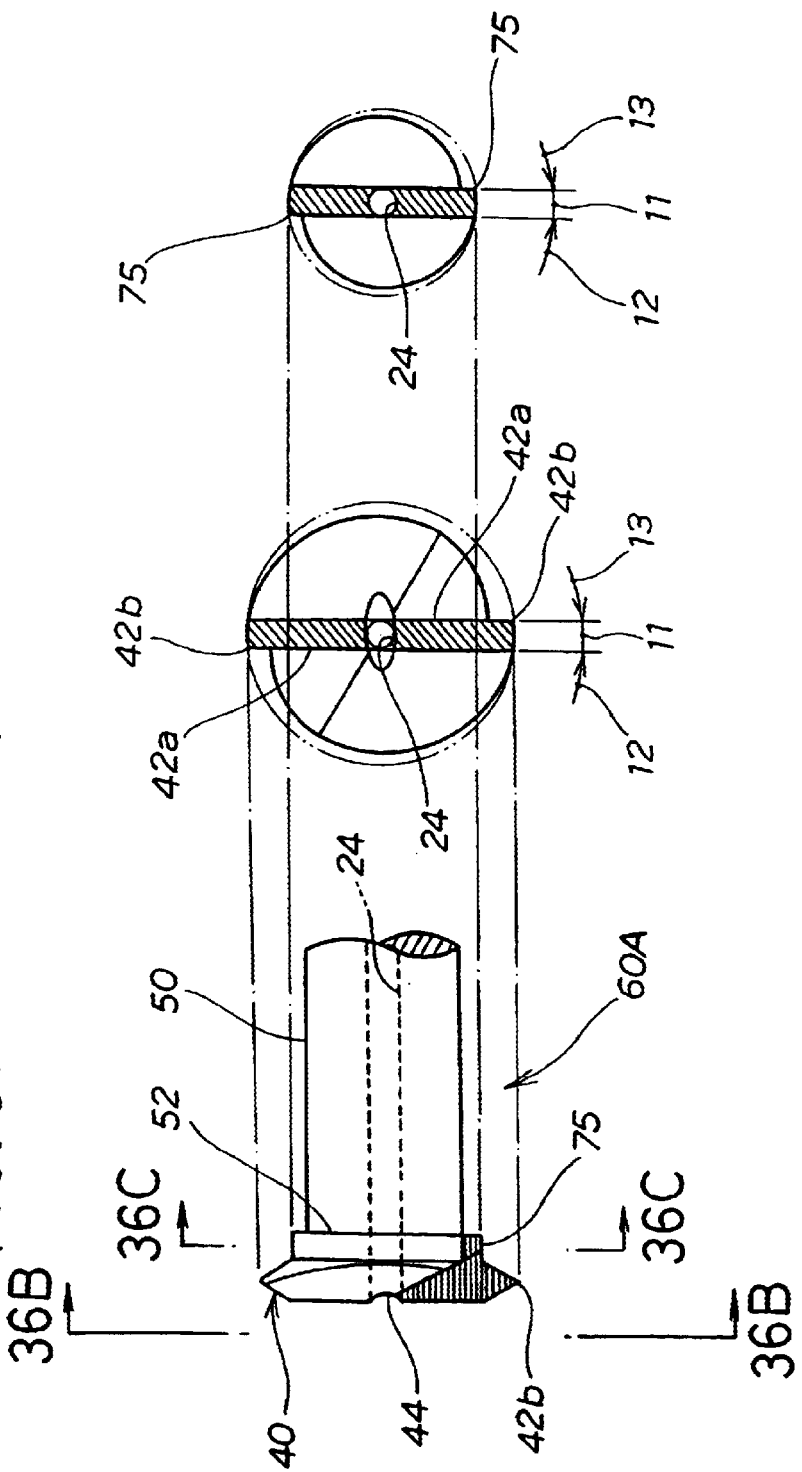

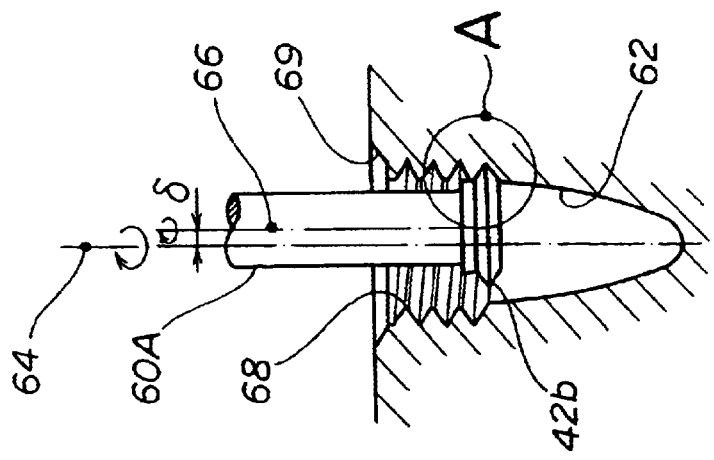
FIG. 37C THREAD CUTTING
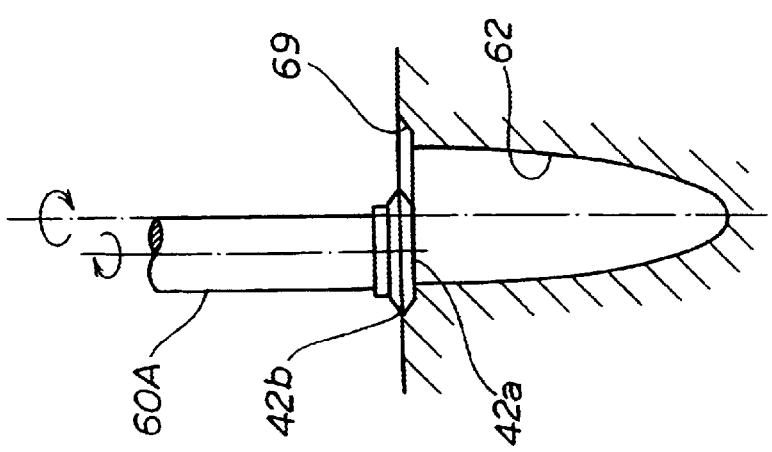
FIG. 37B CHAMFERING
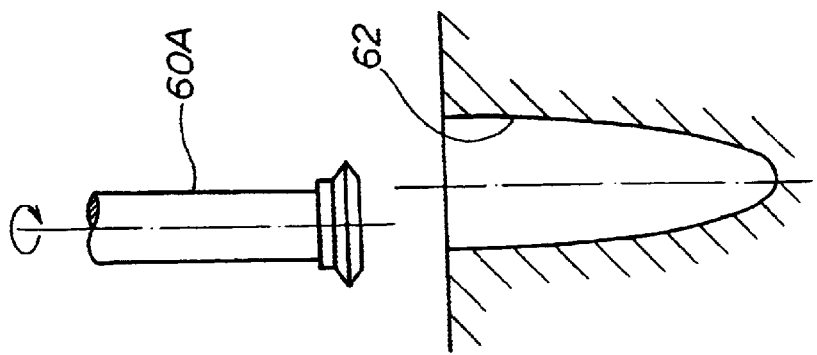
FIG. 37A

THREAD CUTTING FINISHED

BOTTOM FLATTENING

FLATTENING

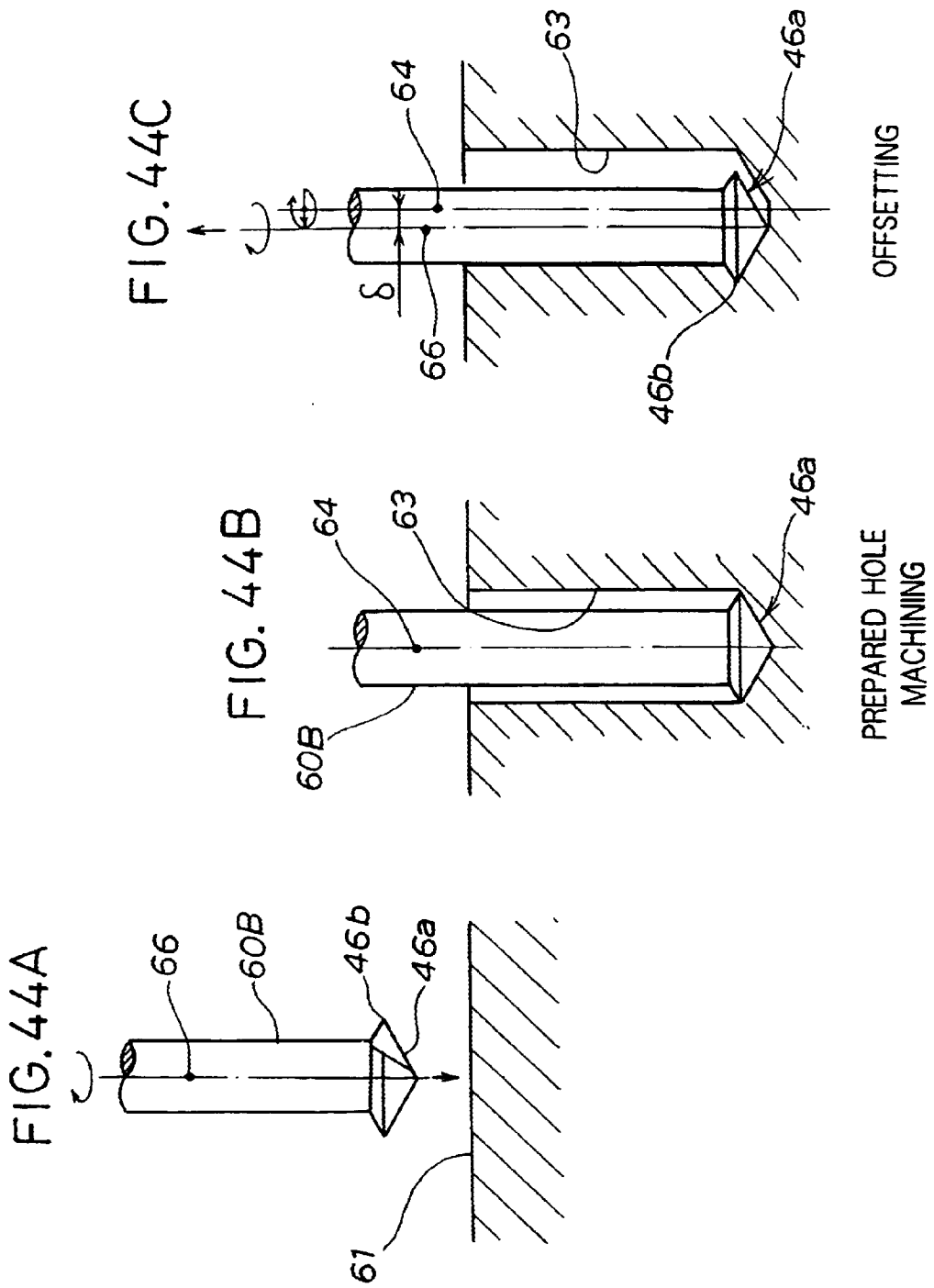

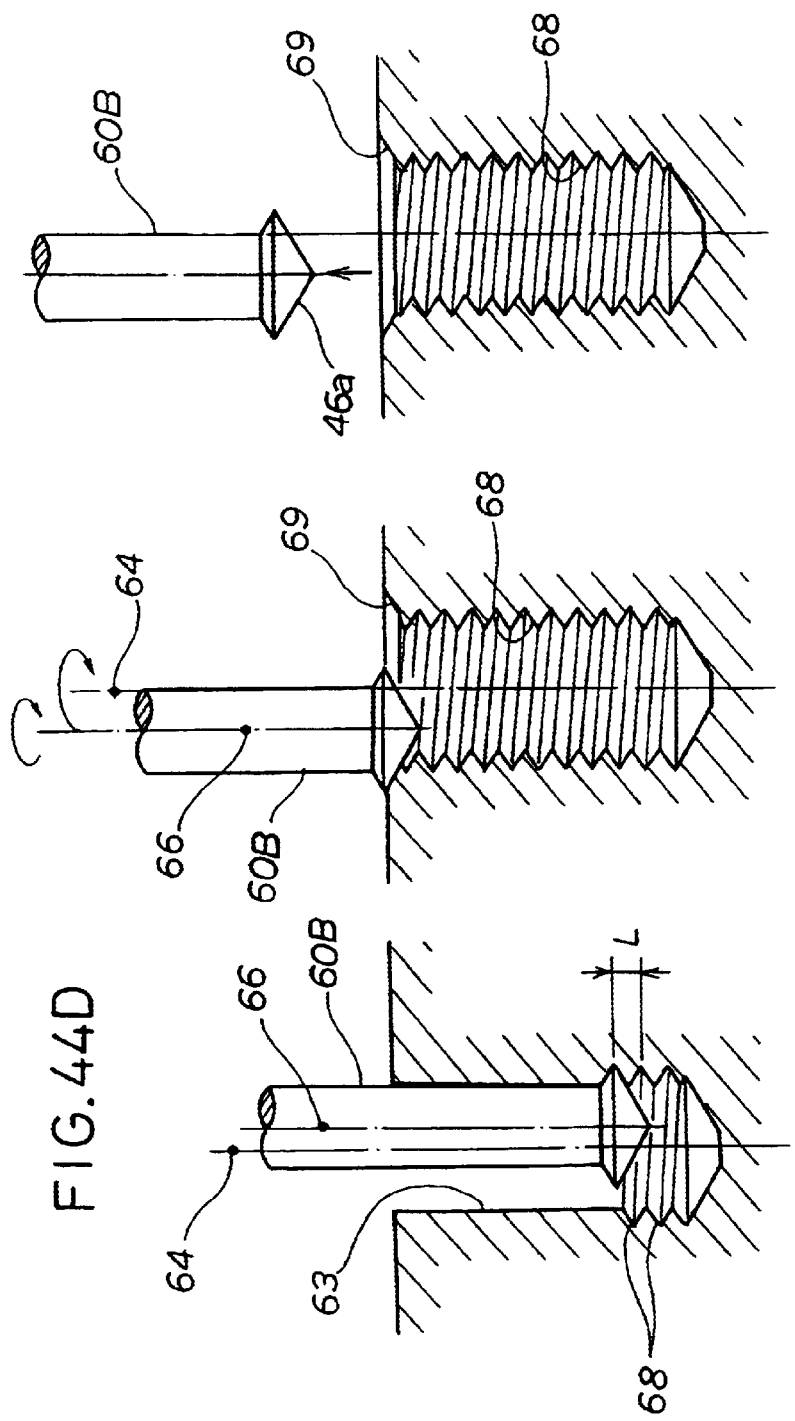

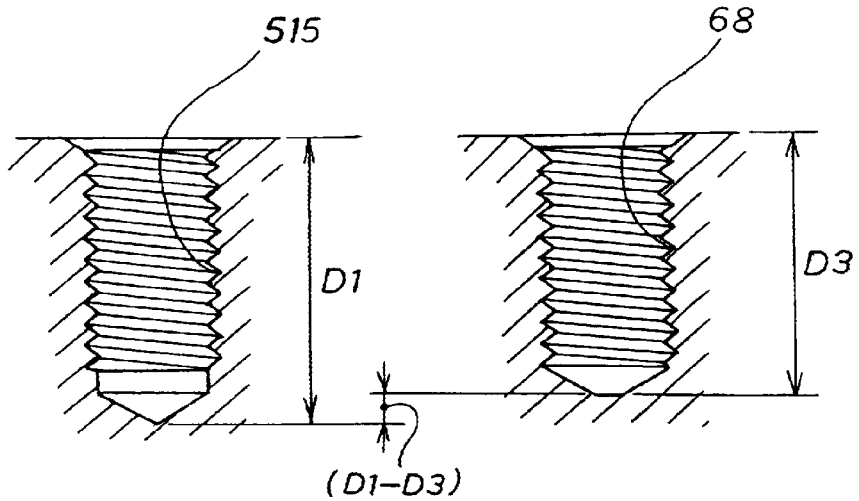
FIG.45A COMPARATIVE EXAMPLE
FIG.45B PREFERRED EMBODIMENT

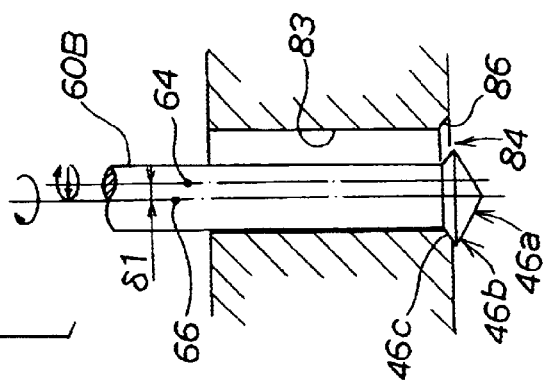
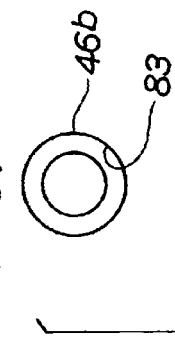
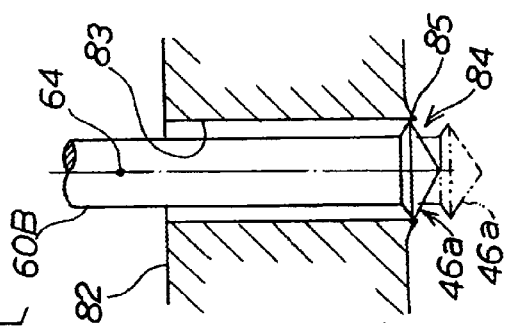
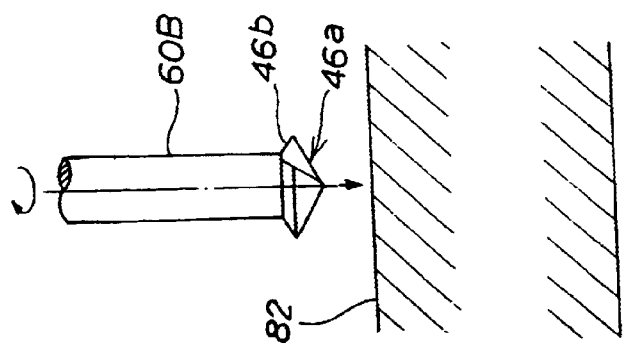
FIG. 46A
FIG. 46B
FIG. 46C

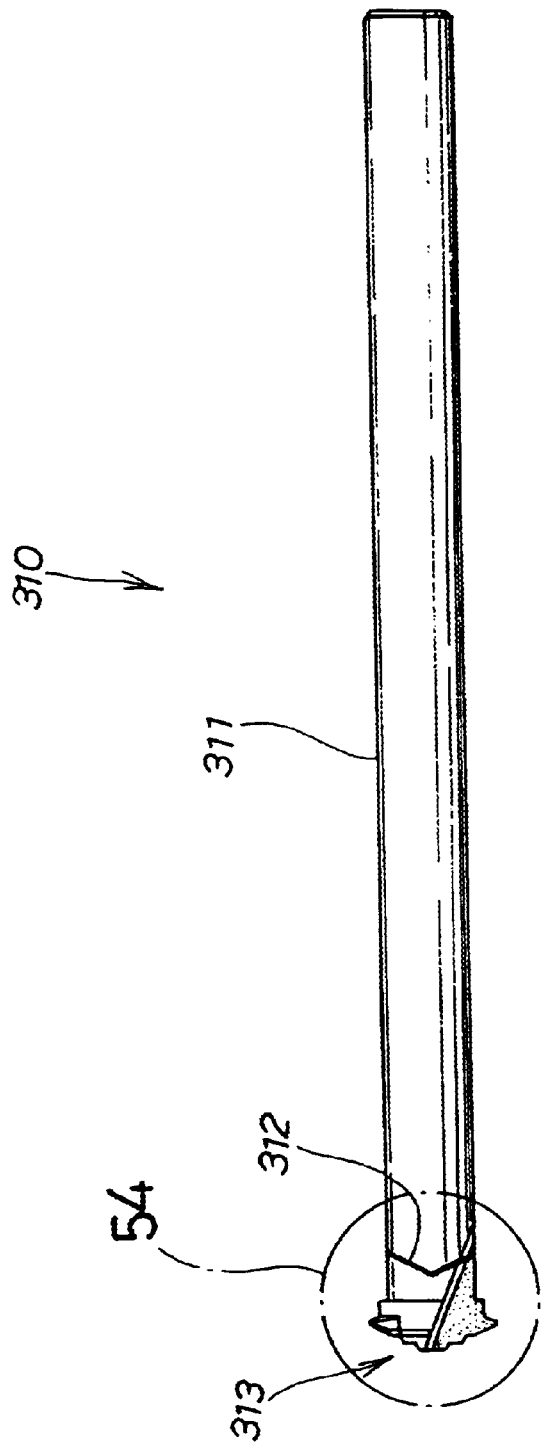

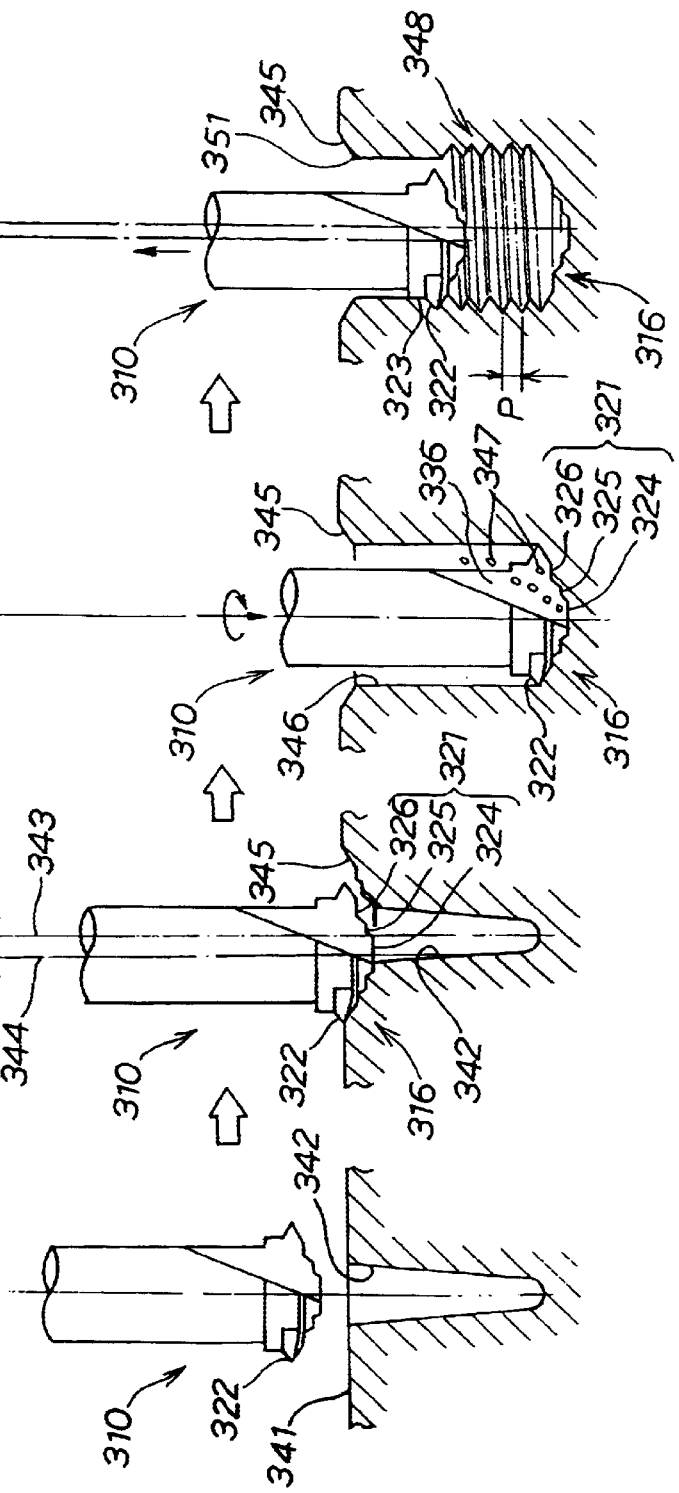

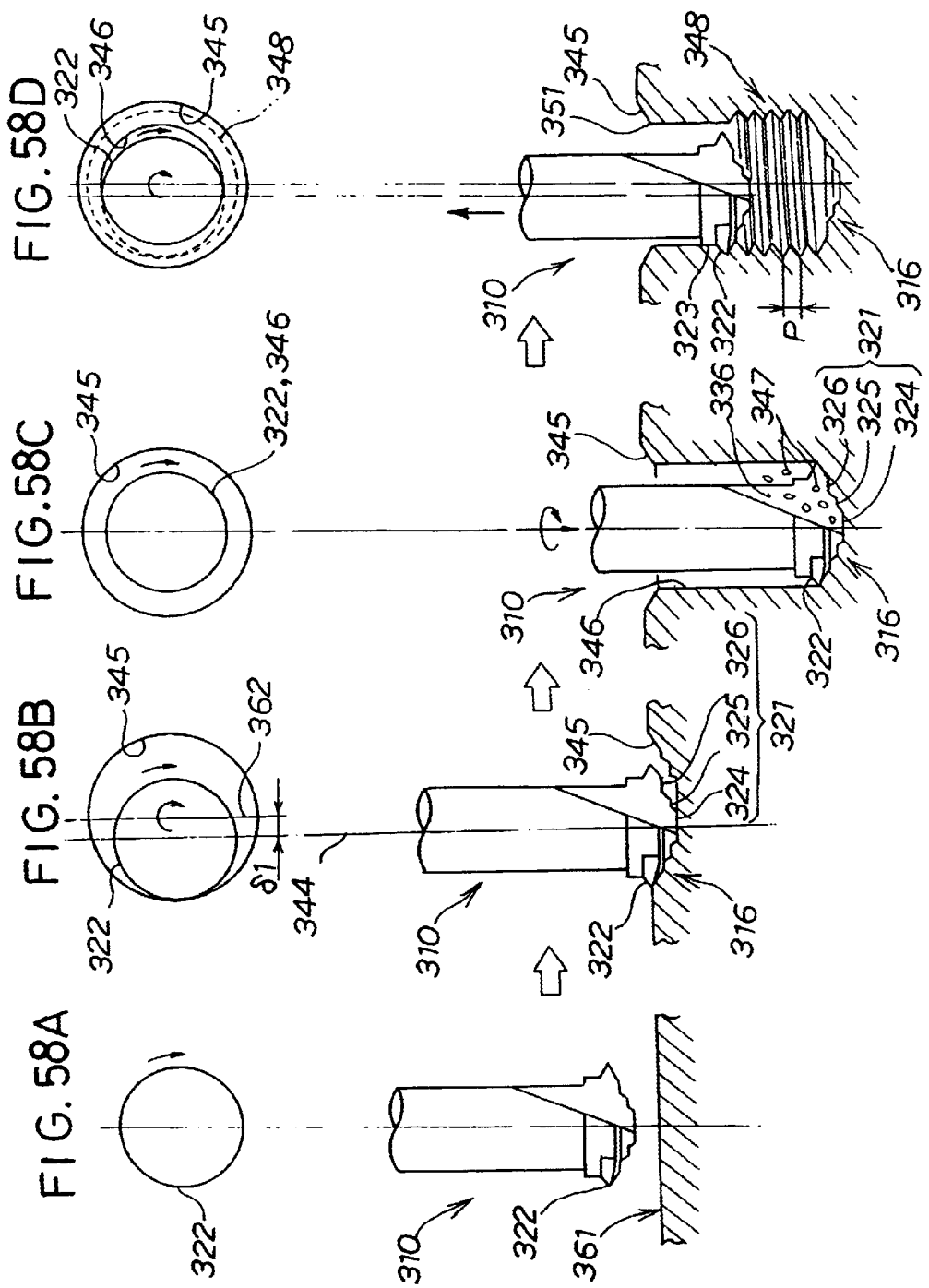

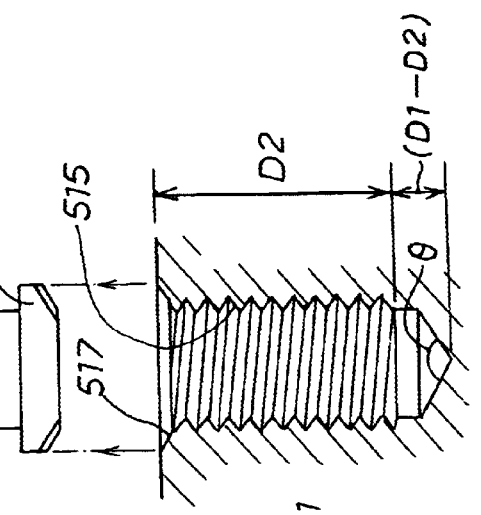
FIG. 59A (PRIOR ART)
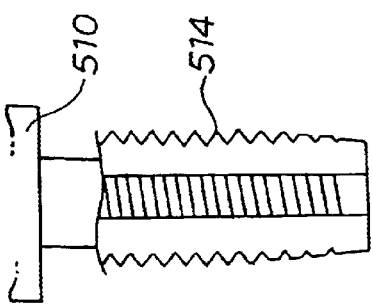
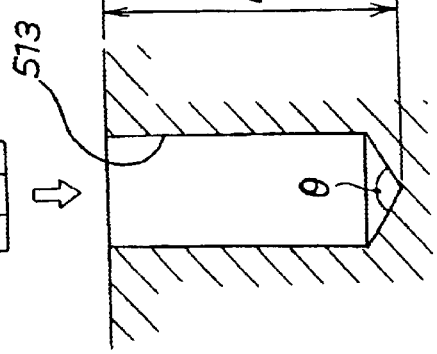
FIG. 59B (PRIOR ART)
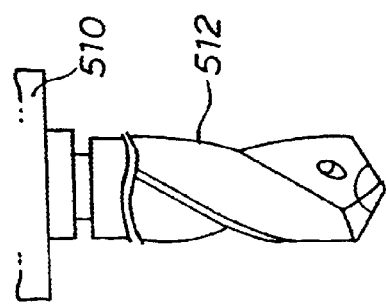
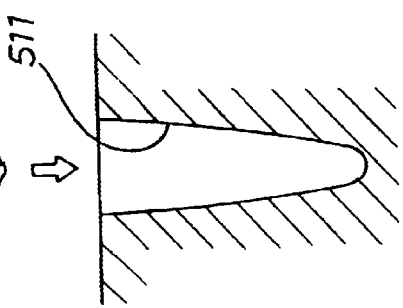
FIG. 59C (PRIOR ART)

CUTTING TIP AND MANUFACTURING METHOD THEREOF

BACKGROUND OF THE INVENTION

1. Field of the Invention

This invention relates to a cutting tip which can be manufactured at low cost, and to the manufacture thereof.

2. Description of the Related Art

Generally, cutting tools are made by attaching a hard cutting tip to the end of a tool body. Cutting tip of this kind include for example the "Twist Drill" disclosed in Japanese Utility Model Laid-Open Publication No. HEI-5-63717 and the "Drill" disclosed in Japanese Utility Model Laid-Open Publication No. HEI-3-117520.

In the "Twist Drill" of Japanese Utility Model Laid-Open Publication No. HEI-5-63717, a wedge-shaped very high pressure sintered tip integrated with a cylindrical body part made from cemented carbide is used as the starting blank of a cutting edge body. This starting blank is fixed to a tool body by a method such as brazing, and the shape of an edge is formed to complete the cutting tool. However, in this "Twist Drill", the starting blank is difficult to manufacture and is expensive. Consequently, as a result of the cost of the cutting tip being high, there has been the problem that the cutting tool is expensive.

In the "Drill" of Japanese Utility Model Laid-Open Publication No. HEI-3-117520, a drill is manufactured by cutting out a pentagonal tip blank from a disc made by surrounding a disc of cemented carbide with a ring-shaped a hard sintered compact. However, in the manufacture of this drill, from a disc of cemented carbide surrounded by a ring of a hard sintered compact, only from one to a few of the pentagonal tip blanks can be cut out, and the yield is poor. Consequently, not much effect of reducing the cost of the cutting tip or the cost of the cutting tool can be expected.

FIGS. 59A through 59C illustrate a typical thread-cutting method of related art.

FIG. 59A: A drill 512 is set in a machine tool 510; the drill 512 is aligned with a cored hole 511, and machining of a prepared hole is started. The point angle θ of the drill 512 is 120° in general.

FIG. 59B: Next, the drill 512 is replaced with a tap 514 for thread-cutting. The reference numeral 513 denotes the prepared hole made with the drill 512, and its depth is D1. The tap 514 is aligned with this prepared hole 513 and thread-cutting is started.

FIG. 59C: The reference numeral 515 denotes a female thread formed by the tap 514. The tap 514 is replaced with a chamfering tool 516, and the entrance of the thread 515 is chamfered with the chamfering tool 516. The reference numeral 517 denotes the chamfer. If the length of the thread 515 including this chamfer 517 is written D2, then an unthreaded part of length (D1–D2) remains.

In this thread-cutting method of related art, to form the thread 515, a drill, a tap and a chamfering tool are necessary; thus the number of tools required is large, tool supply costs are high and tool management costs are high. Also, it is necessary for tools to be interchanged during the process from the hole-making to the chamfering. Because of this, the cutting work must be stopped for every tool change, the thread-cutting machining operation is troublesome, and there are problems of productivity.

Also, because an unthreaded part of length (D1–D2) is unavoidable, the unthreaded part must be allowed for in the casting, and consequently there has been the problem that it is not possible to make the casting thin.

Next, as the cutting tool for finishing the hole, generally a reamer is used, to finish the opened hole in advance exactly and obtain a smooth finished surface at the same time. By machining the hole with a reamer, an accurate hole can be obtained. As the procedure for finishing a hole with a reamer, first a small-diameter hole is made with a drill, and then by dragging the wall of the hole with the reamer the hole diameter is finished to the required accuracy (for example, dimensional accuracy H7 (JIS B 0401).

Thus, a reamer is necessary to obtain an accurate hole; however, with this finishing method, the number of tools required is large, numerous tools have to be set on and removed from the machine tool, and preparation is troublesome. Also, hole-finishing with a reamer takes time, and it is necessary for machining with the machine tool to be stopped for the tool change from the drill to the reamer to be carried out. Consequently, the productivity of the hole-machining is low.

SUMMARY OF THE INVENTION

It is therefore a first object of the present invention to provide an inexpensive cutting tip and cutting tool and a method by which this cutting tool can be manufactured.

It is a second object of the invention to provide a thread-cutting method with which it is possible to reduce the number of tools required for thread-cutting and to dispense with an unthreaded part.

It is a third object of the invention to provide a hole-finishing drill which allows good productivity.

According to a first aspect of the present invention, there is provided a cutting tip having a first layer consisting of a cemented carbide tool material, a second layer consisting of a hard sintered compact of CBN or diamond, and a third layer consisting of a cemented carbide tool material; the second layer is sandwiched by the first layer and the third layer to form a three-layer laminate, and a cutting edge is formed in the second layer.

Because the cutting tip as a whole is a three-layer structure, and the second layer is reinforced on both sides by the first layer and the third layer, the rigidity of the tip increases.

According to a second aspect of the present invention, there is provided a method for manufacturing a cutting tip, the method including a preparation step of preparing a three-layer laminate wherein a second layer consisting of a hard sintered compact of CBN or diamond is sandwiched by a first layer and a third layer consisting of a tool material such as cemented carbide, a first cutting step of cutting out a prismatic blank of rectangular cross-section by cutting the first layer, the second layer and the third layer in order substantially perpendicularly to the upper face of the first layer, a second cutting step of cutting out a semi-completed tip including the second layer in the middle thereof by cutting from one cut face of the prismatic blank to the other cut face, and a finishing step of obtaining a completed tip by forming on the semi-completed tip a rake face, a cutting edge and a flank.

Because the three-layer laminate is cut in strips and semi-completed tips are cut out from the prismatic blanks obtained, semi-completed tips can be obtained in large numbers. Consequently yield is good, and the manufacturing cost of the tip can be greatly reduced.

According to a third aspect of the present invention, there is provided a cutting tool made up of a shank and a tip attached to the shank, wherein the tip is made from a three-layer laminate wherein a second layer consisting of a hard sintered compact of CBN or diamond is sandwiched by a first layer and a third layer consisting of a tool material such as cemented carbide, and when the cutting tool is seen in front view, the second layer is a narrow band passing through the center of rotation of the tool, a cutting edge is formed in this narrow band, and the second layer is reinforced on both sides by the layer and the third layer.

If an oil passage is formed in the shank and another oil passage is formed in the second layer of the tip and the two oil passages connect in a straight line, cutting oil can be injected through the oil passages at the time of cutting. And these holes can be utilized as positioning parts when the tip is attached to the shank.

According to a fourth aspect of the present invention, there is provided a method for manufacturing a cutting tool made up of a shank and a tip attached to the shank, the method including a preparation step of preparing a three-layer laminate wherein a second layer consisting of a hard sintered compact of CBN or diamond is sandwiched by a first layer and a third layer consisting of a tool material such as cemented carbide, a first cutting step of cutting out a prismatic blank of rectangular cross-section by cutting the first layer, the second layer and the third layer in order substantially perpendicularly to the upper face of the first layer, a second cutting step of cutting out a semi-completed tip including the second layer in the middle thereof by cutting from one cut face of the prismatic blank to the other cut face, a joining step of joining the semi-completed tip to a separately prepared shank, and a finishing step of obtaining a completed tip by forming on the semi-completed tip a rake face, a cutting edge and a flank.

Thus, cutting tools are obtained by cutting a three-layer laminate in strips, cutting out numerous semi-completed tips from the prismatic blanks obtained, attaching the semi-completed tips to shanks, and finishing the tips. Consequently, because yield is extremely good and the manufacturing cost of the tips can be greatly reduced, the manufacturing cost of the cutting tool can be reduced.

Preferably, oil passages are made in advance in the shank and in the semi-completed tip and in the joining step the semi-completed tip is positioned on the shank by a pin being passed through the two holes and joining of the semi-completed tip and the shank is carried out in this state. Because the semi-completed tip can be positioned with respect to the shank by a pin being passed through the two oil passages like this, a cutting tool having good dimensional accuracy can be manufactured easily.

According to a fifth aspect of the present invention, there is provided a method for manufacturing a cutting tip, the method including a preparation step of preparing a three-layer laminate wherein a second layer consisting of a hard sintered compact of CBN or diamond is sandwiched by a first layer and a third layer consisting of a tool material such as cemented carbide, a first cutting step of cutting out a prismatic blank of rectangular cross-section by cutting the first layer, the second layer and the third layer in order substantially perpendicularly from the upper face of the first layer, a second cutting step of cutting out a semi-completed tip including the second layer in the middle thereof by cutting the prismatic blank on a cutting plane orthogonal to or inclined at a predetermined angle to the cut face of the first cutting step, and a finishing step of obtaining a completed tip by forming on the semi-completed tip a rake face, a cutting edge and a flank.

According to a sixth aspect of the present invention, there is provided a method for manufacturing a cutting tool made up of a shank and a tip attached to the shank, the method including a preparation step of preparing a three-layer laminate wherein a second layer consisting of a hard sintered compact of CBN or diamond is sandwiched by a first layer and a third layer consisting of a tool material such as cemented carbide, a first cutting step of cutting out a prismatic blank of rectangular cross-section by cutting the first layer, the second layer and the third layer in order substantially perpendicularly to the upper face of the first layer, a second cutting step of cutting out a semi-completed tip including the second layer in the middle thereof by cutting the prismatic blank on a cutting plane orthogonal to or inclined at a predetermined angle to a cut face of the first cutting step, a joining step of joining the semi-completed tip to a separately prepared shank, and a finishing step of obtaining a completed tip by forming on the semi-completed tip a rake face, a cutting edge and a flank.

According to a seventh aspect of the present invention, there is provided a thread-cutting tool made up of a shank and a tip attached to the shank, wherein the tip is made up of a three-layer laminate in which a second layer consisting of a hard sintered compact of CBN or diamond is sandwiched by a first layer and a third layer consisting of a tool material such as cemented carbide, and, when the thread-cutting tool is seen in front view, the second layer is a thin band passing through the center of rotation of the tool, an end cutting edge and a thread-cutting edge are formed in this narrow band, and the second layer is reinforced on both sides by the first layer and the third layer.

A prepared hole is made with the end cutting edge of the thread-cutting tool, and thread-cutting is carried out with the thread-cutting edge. Because chamfering is also possible with the thread-cutting edge and the end cutting edge, the thread-cutting process can be carried out with a single tool. This single thread-cutting tool is obtained by cutting a three-layer laminate along parallel lines, cutting out numerous semi-completed tips from the prismatic blanks thus obtained, attaching these semi-completed tips to shanks, and finishing the tips. Accordingly, yield is good and the manufacturing cost of the thread-cutting tool can be reduced.

A flat drag of smaller diameter than the thread-cutting edge and larger diameter than the shank is formed on the side of the tip attached to the shank, and the end cutting edge, the thread-cutting edge and the flat drag are formed in this order in the second layer. While a thread is being cut with the thread-cutting edge, the rake simultaneously cuts flat the crests of the thread ridges, and the bottom of the threaded hole is finished by the end cutting edge. The reason for cutting the crests of the thread ridges is to prevent the shank from making contact with the thread ridges.

An oil passage is formed in the shank and an oil passage is formed in the second layer of the tip, and the two oil passages connect in a straight line. When thread-cutting is carried out, cutting oil is injected through the oil passages.

According to an eighth aspect of the present invention, there is provided a method for cutting a thread using a thread-cutting tool, the method including a prepared hole machining step of making a prepared hole of substantially the same diameter as the external diameter of the thread-cutting tool by passing the thread-cutting tool into a cored hole while rotating it about a threaded hole axis, an offsetting step of offsetting the axis of the thread-cutting tool from the threaded hole axis by a predetermined distance after the end of the thread-cutting tool reaches the bottom of the prepared hole and starting thread-cutting in the prepared hole with a thread-cutting edge formed on the tool, and a thread-cutting step of cutting a thread with the thread-cutting edge by rotating the axis of the thread-cutting tool about the threaded hole axis while gradually withdrawing the thread-cutting tool in correspondence with the lead of the thread.

Because the bottom of the threaded hole is finished at the same time as the prepared hole is made with an end cutting edge, the depth of the prepared hole and the thread depth become essentially the same, and it is possible to dispense with an unthreaded part.

According to a ninth aspect of the present invention, there is provided a method for cutting a thread using a thread-cutting tool, the method including a thread-cutting step of cutting a thread in a cored hole with a thread-cutting edge by offsetting the axis of the thread-cutting tool from the threaded hole axis by a predetermined distance and then turning the thread-cutting tool about the threaded hole axis and rotating the thread-cutting tool and advancing the thread-cutting tool in correspondence with the lead of the thread, a thread ridge dragging step of dragging with a flat drag formed on the thread-cutting tool the crests of the ridges of the thread cut out with the thread-cutting edge, and a bottom finishing step of finishing with an end cutting edge formed on the thread-cutting tool the bottom of the threaded hole.

By this means it is possible to carry out thread-cutting with an advancing movement of a thread-cutting tool without making a prepared hole in a cored hole. And because after the thread-cutting it is only necessary to remove the tool, the time required for thread-cutting can be shortened.

According to a tenth aspect of the present invention, there is provided a thread-cutting tool made up of a shank and a tip attached to the shank, wherein the tip is made up of a three-layer laminate in which a second layer consisting of a hard sintered compact of CBN or diamond is sandwiched by a first layer and a third layer consisting of a tool material such as cemented carbide, and, when the thread-cutting tool is seen in front view, the second layer is a thin band passing through the center of rotation of the tool, a drill edge and a thread-cutting edge are formed in this narrow band, and the second layer is reinforced on both sides by the first layer and the third layer.

A prepared hole is made with the drill edge of the thread-cutting tool, thread-cutting is carried out with the thread-cutting edge of the thread-cutting tool, and because chamfering is also possible with the drill edge, the thread-cutting process can be carried out with a single tool.

At least two oil passages are provided in the shank, and to face these oil passages at least one oil passage is provided in each of the first layer and the third layer of the tip so that the oil passages in the shank and the oil passages in the tip are connected. When a plurality of oil passages are provided in this way, more cutting oil can be injected, and thread-cutting can be carried out smoothly.

According to an eleventh aspect of the present invention, there is provided a thread-cutting method including a prepared hole machining step of making a prepared hole in a workpiece with a drill edge formed on a thread-cutting tool by rotating the thread-cutting tool about a threaded hole axis, an offsetting step of offsetting the axis of the thread-cutting tool from the threaded hole axis by a predetermined distance after the thread-cutting tool reaches the bottom of the prepared hole and starting thread-cutting in the prepared hole with a thread-cutting edge formed on the thread-cutting tool, and a thread-cutting step of cutting a thread with the thread-cutting edge by rotating the axis of the thread-cutting tool about the threaded hole axis while gradually withdrawing the thread-cutting tool in correspondence with the lead of the thread.

According to a twelfth aspect of the present invention, there is provided a method for cutting a thread using a thread-cutting tool, which method comprises the steps of: making a prepared through hole in a workpiece with a drill edge formed on a thread-cutting tool by rotating the thread-cutting tool about a threaded hole axis; chamfering an outlet of the prepared through hole with a back of the drill edge; offsetting a center axis of the thread-cutting tool from a threaded hole axis by a predetermined distance for cutting a thread in the prepared through hole with a thread-cutting edge formed on the thread-cutting tool; and cutting a thread in the through hole with the thread-cutting edge by gradually pulling the thread-cutting tool out from the hole in correspondence with a lead of the thread while rotating the axis of the thread-cutting tool about the threaded hole axis.

In this arrangement, the prepared through hole is first formed in the workpiece by means of the drill edge. At this time, a burr is produced at a peripheral edge of an outlet of the prepared through hole. Then, a chamfer is provided at the outlet by using the back of the drill edge (part of the thread-cutting edge). The burr is removed upon chamfering. Continuously, thread cutting is performed on the prepared through hole upwardly from the outlet. In this arrangement, only a single tool is thus required to achieve the prepared through hole machining, chamfering and thread cutting.

According to a thirteenth aspect of the present invention, there is provided a hole-finishing drill made up of a shank and a tip attached to the shank, wherein the tip is made up of a three-layer laminate wherein a second layer consisting of a hard sintered compact of CBN or diamond is sandwiched by a first layer and a third layer consisting of a tool material such as cemented carbide; when the drill is seen in front view, the second layer is a thin band passing through the center of rotation of the tool, a cutting edge is formed in this narrow band, and a pair of lands are formed on the periphery of the tip; the cutting edge is a stepped edge formed with a plurality of steps in the form of a stairway radially outward from the drill center; and guide pads for preventing run out of the tip are formed projecting on the lands of the drill.

Because the cutting edge is stepped, chips are broken up finely. Consequently, a chip discharge groove formed in the drill can be made small, and the rigidity of the drill can be increased Since the guide pads formed on lands of the drill make contact with the wall face of the hole, run out of the tip is prevented, the wall face is cut smoothly, and the dimensional accuracy of the hole increases. In this way, a hole-making process and a finishing process can be carried out with a single drill.

According to a fourteenth aspect of the present invention, there is provided a cutting tool made up of a shank and a tip attached to the shank, wherein the tip is made up of a three-layer laminate wherein a second layer consisting of a hard sintered compact of CBN or diamond is sandwiched by a first layer and a third layer consisting of a tool material such as cemented carbide; when the cutting tool is seen in front view, the second layer is a thin band passing through the center of rotation of the tool, and a cutting edge is formed in this narrow band; and an end cutting edge constructed in the form of a stairway to keep chips small, a thread-cutting edge for cutting a thread, and a flat drag the same diameter as the internal diameter of the female thread are formed in the cutting edge in this order from the end of the tip toward the shank.

The tip has an end cutting edge having a plurality of steps, a thread-cutting edge and a flat drag. A chamfering process is carried out in advance by the thread-cutting edge. A hole-preparing process is carried out by the end cutting edge and the thread-cutting edge. Crests of ridges of a female thread having a predetermined internal diameter are formed by the flat drag the same diameter as the internal diameter of the female thread. Because a chamfer formed at the opening of the threaded hole is made in advance like this, when the thread-cutting process ends there is no formation of a burr at the threaded hole opening, and means for removing a burr are not necessary. Thus in this invention, machining of a chamfer, hole-preparing, thread-cutting, and machining of thread ridges can be carried out with a single cutting tool. As a result, there is no need for tool changes, and cutting work can be carried out continuously, without stopping.

BRIEF DESCRIPTION OF THE DRAWINGS

A number of presently preferred embodiments of the invention will now be described in detail below, by way of example only with reference to the accompanying drawings, in which:

FIGS. 34A, 34B, 34C, 34D, 34E, and 34F are views illustrating steps in a process for cutting a thread using the cutting tool shown in FIG. 8 and FIG. 9 as a first preferred embodiment;

FIGS. 36A, 36B, and 36C illustrate another preferred embodiment of a thread-cutting tool having a flat drag, with FIG. 36B being a front view on the line b—b in the side view of FIG. 36A and FIG. 36C being a sectional view on the line c—c in the side view of FIG. 36A;

FIGS. 37A, 37B, 37C, 37D, 37E, and 37F are views illustrating steps in a process for cutting a thread using the thread-cutting tool shown in FIGS. 36A, 36B, and 36C, FIG. 37D being an enlarged view of the part A in FIG. 37C;

FIGS. 44A, 44B, 44C, 44D, 44E, and 44F are views illustrating steps in a process for cutting a thread using the thread-cutting tool shown in FIG. 42 and FIG. 43;

FIGS. 45A and 45B illustrate a comparison between a threaded hole in related art and a threaded hole formed by a threading method according to the invention;

FIGS. 46A, 46B, 46C, 46D, 46E, and 46F are views illustrating steps in a process for forming a threaded through hole using the cutting tool shown in FIGS. 42 and 43;

FIG. 53 is a side view showing another preferred embodiment of a cutting tool;

FIGS. 57A, 57B, 57C, and 57D are views illustrating steps in a process for cutting a thread in a cored hole in a casting by means of the cutting tool shown in FIGS. 54 through 56;

FIGS. 58A, 58B, 58C, and 58D are views illustrating steps in a process for cutting a thread in which dose not have a cored hole in a casting by means of the cutting tool shown in FIGS. 54 through 56; and FIGS. 59A, 59B, and 59C are views illustrating steps in typical thread-cutting process in related art.

DETAILED DESCRIPTION OF THE PREFERRED EMBODIMENTS

Figure 1:
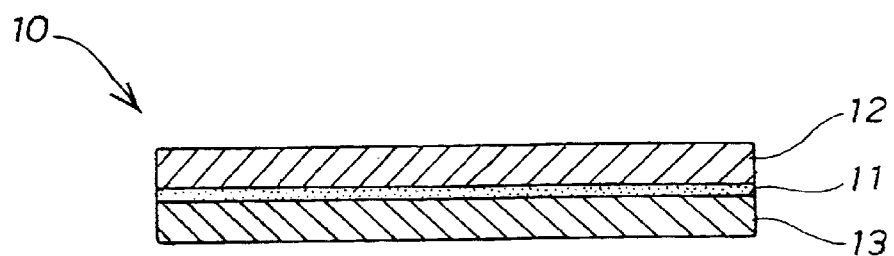
FIG. 1 is a sectional view of a three-layer laminate employed in the invention.

In FIG. 1, a three-layer laminate 10 has a layered structure wherein a second layer 11 is made from a hard sintered compact of cubic boron nitride (CBN) or diamond and this second layer 11 is sandwiched by a first layer 12 and a third layer 13 made from a tool material such as cemented carbide. For example the thickness of the second layer 11 is 1 mm, the thicknesses of the first layer 12 and the third layer 13 are each 5 mm, and the thickness of the three-layer laminate 10 as a whole is 11 mm.

CBN is a man-made abrasive grain which., along with diamond, is used widely in cutting tips. CBN is suited to the cutting of ferrous workpieces, and diamond is suited to the cutting of nonferrous workpieces.

As an example of a method for manufacturing the three-layer laminate 10, first the second layer 11 is manufactured by sintering 4 μm to 16 μm diamond particles or CBN particles under a constant pressure by Hot Isostatic Pressing (HIP), and then the three-layer laminate 10 is obtained by laying tungsten-carbide (WC) powder on both sides of this second layer 11 and sintering under pressure by HIP.

In this invention, HIP may be replaced with HP (Hot Pressing) or Cold Isostatic Pressing (CIP), and indeed any known sintering method may be used.

Figure 2:
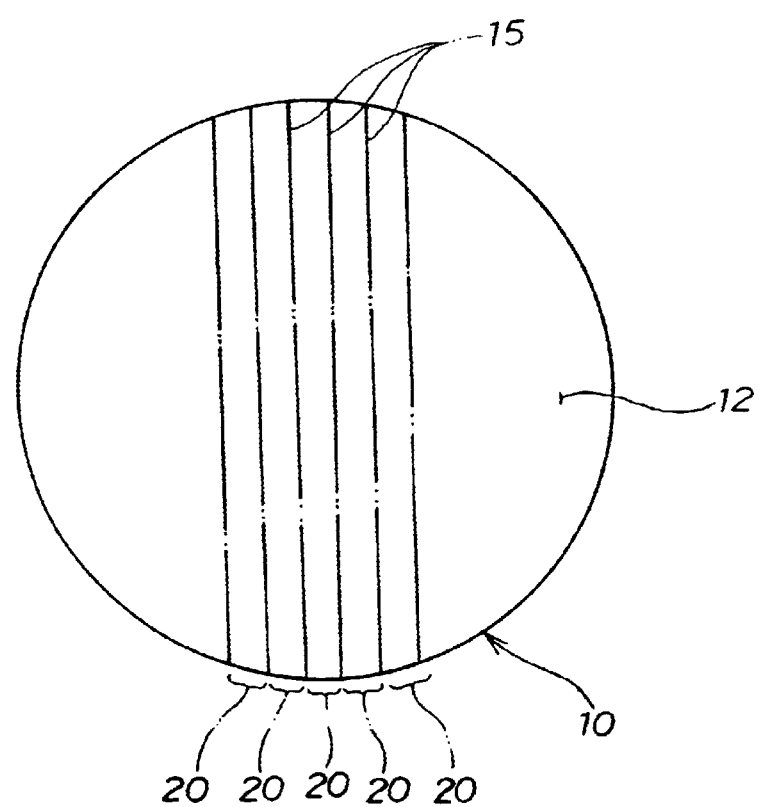
FIG. 2 is a plan view of FIG. 1 illustrating a method for cutting numerous prismatic blanks in parallel from a three-layer laminate in the manufacture of a tip.

FIG. 2 is a plan view of the three-layer laminate shown in FIG. 1. In FIG. 2, by cutting the three-layer laminate 10 along multiple cutting lines 15 and essentially perpendicular to the top face of the first layer 12, numerous prismatic blanks 20 are cut out. As is clear from the figure, the prismatic blanks 20 can be cut out with extremely good yield (for example 90% yield).

Figure 3:
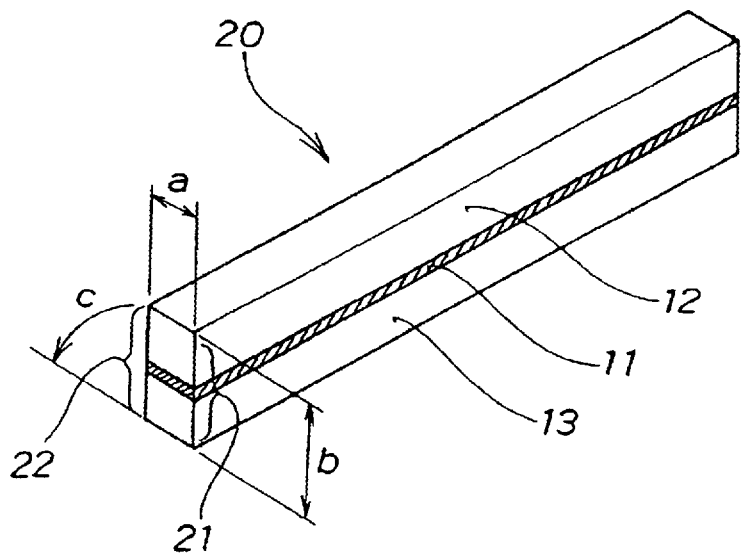
FIG. 3 is a perspective view of a prismatic blank cut in FIG. 2.

An enlarged view of one of the prismatic blanks 20 thus cut out is shown in FIG. 3. If the width of cutting out of the prismatic blank 20 is written a and the thickness of the three-layer laminate is written b, then the prismatic blank 20 is a long-by-narrow member with a rectangular cross-section a×b and is a laminate of the first layer 12, the second layer 11 and the third layer 13. Of the mutually opposing cut faces of this prismatic blank 20, the right face in FIG. 3 will be called the cut face 21 and the left face will be called the cut face 22. For convenience, the prismatic blank 20 is laid on its side in the direction of the arrow c in FIG. 3 so that the cut face 21 faces upward.

Figure 4:
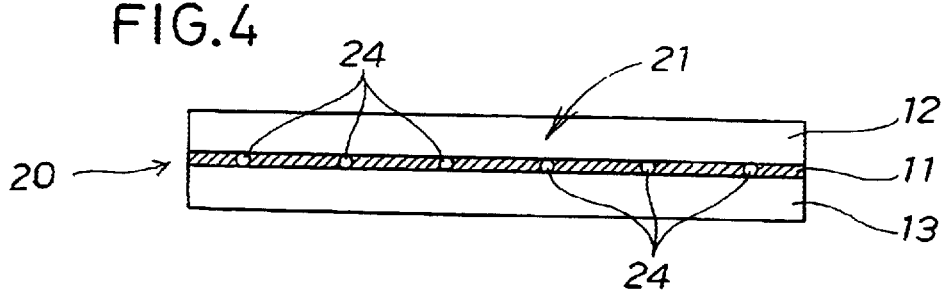
FIG. 4 is a view illustrating oil passages formed in the prismatic blank shown in FIG. 3.

FIG. 4 shows a prismatic blank 20 having oil passages for transporting cutting oil. A plurality of these oil passages 24 are provided with a predetermined pitch in the second layer 11 of the prismatic blank 20. Specifically, these holes are made by electric discharge machining using a pipe electrode from the cut face 21 to the cut face 22 (see FIG. 3), that is, from the front side of the drawing toward the rear side.

Figure 5:
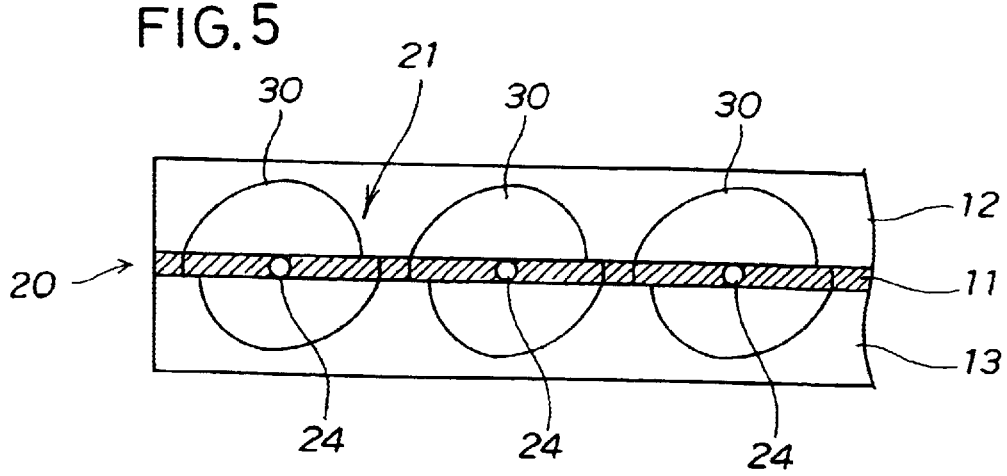
FIG. 5 is a view illustrating how semi-completed tips are cut out from the prismatic blank shown in FIG. 4.

FIG. 5 shows how semi-completed tips are cut out from this prismatic blank 20. That is, numerous semi-completed tips 30 are each cut out by the prismatic blank 20 being cut from the cut face 21 to the cut face 22 (see FIG. 3), or from the front side of the drawing to the rear side, so as to include one of the oil passages 24. Specifically, they are cut out by wire cut electric discharge machining.

Figure 6:
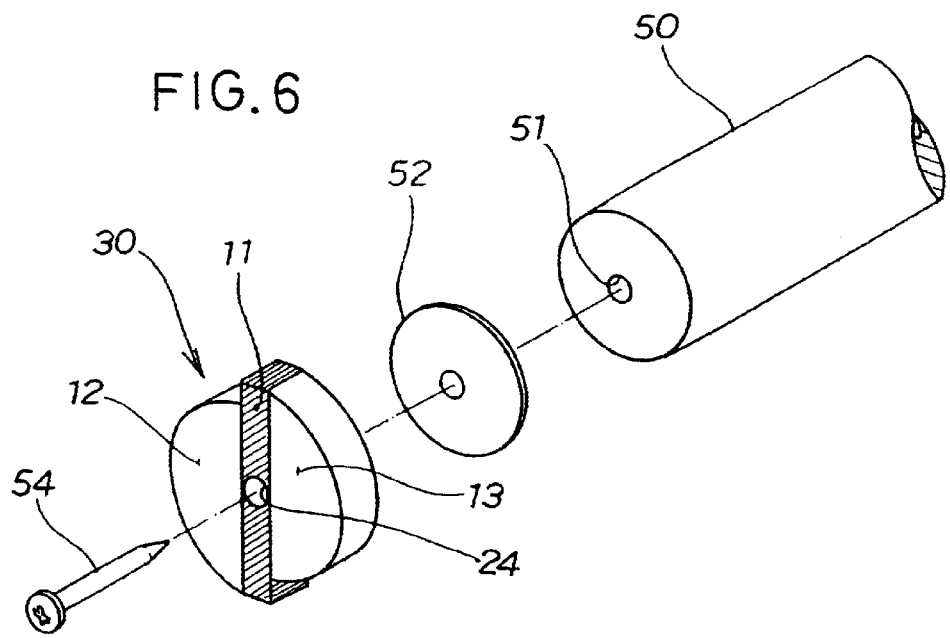
FIG. 6 is a perspective view illustrating how a semi-completed tip is attached to a shank.
Figure 7:
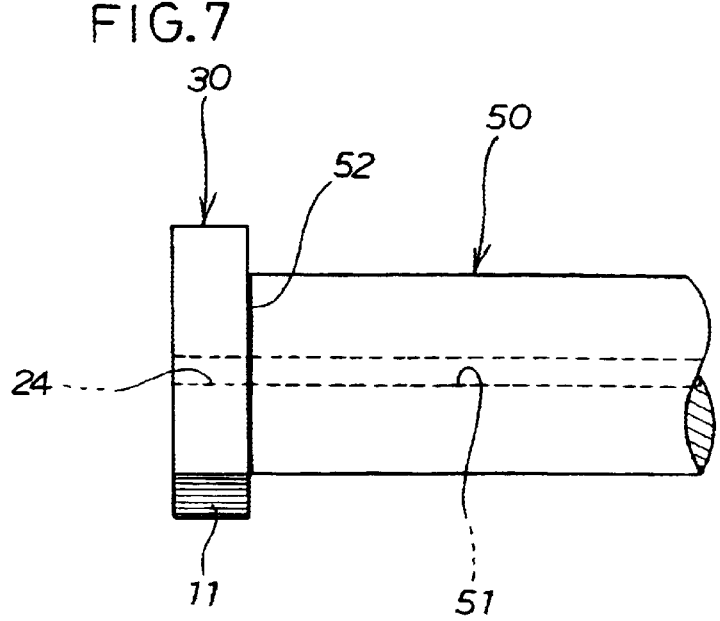
FIG. 7 is a side view of a shank and a semi-completed tip joined together.

FIG. 6 is a perspective view of a semi-completed tip thus cut out and a shank. The semi-completed tip 30 is fixed to the end of a shank 50 made by forming an oil passage 51 in a round bar of tool steel and finishing the round bar to a predetermined diameter. Preferably a pin 54 is passed through the oil passage 24 and the oil passage 51 to raise the accuracy with which the semi-completed tip 30 is positioned. The semi-completed tip 30 is joined to the end of the shank 50 by being brazed to the shank 50 with brazing filler metal 52, whereby a combined shank and semi-completed tip is manufactured, as shown in FIG. 7.

Figure 8:
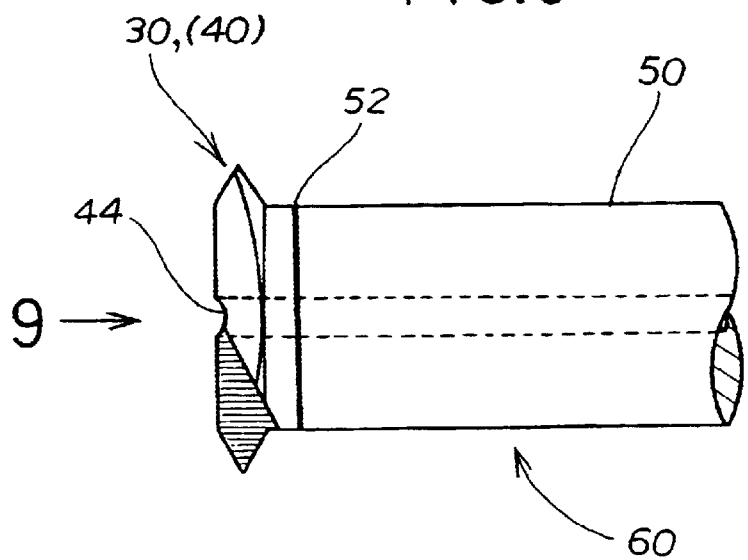
FIG. 8 is a side view of a cutting tool pertaining to a first preferred embodiment of the invention with a semi-completed tip finished as a tip.
Figure 9:
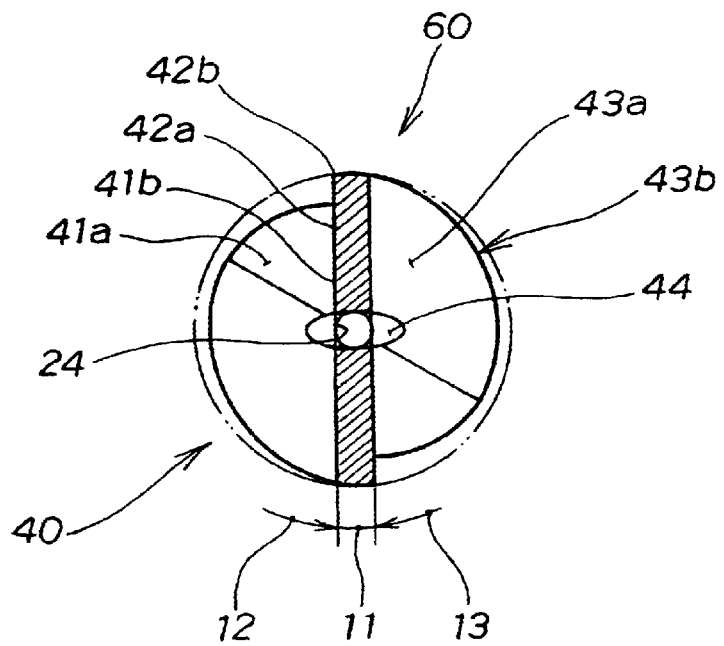
FIG. 9 is a view in the direction of the arrow 9 in FIG. 8.

As shown in FIG. 8 and FIG. 9, a tip 40 is finished by forming on the semi-completed tip 30 rake faces (a front rake face 41a and a side rake face 41b), cutting edges (a front cutting edge 42a and a side cutting edge 42b), flanks (a front flank 43a and a side flank 43b), and a tip oil groove 44.

The rake face, the cutting edge and the flank are also formed below the tip oil groove 44 in the figure.

As a result, as shown in FIG. 9, when the cutting tool 60 is seen from the front, the second layer 11 is a narrow band passing through the center of rotation of the tool, and the cutting edges 42a, 42b are formed in this narrow band. The second layer 11 is reinforced on both sides by the first layer 12 and the third layer 13. Also, by the tip oil groove 44 being so provided as to include the oil passage 24, an ample flow of cutting oil can be supplied to the part of the workpiece being cut.

As will be clear from the foregoing description, a method for manufacturing a cutting tool according to this first preferred embodiment includes a first cutting step of cutting out the prismatic blank 20 of rectangular cross-section shown in FIG. 3 by cutting the three-layer laminate 10 shown in FIG. 1 from the top face of the first layer 12 substantially perpendicularly in the order of the first layer 12, the second layer 11 and the third layer 13, a second cutting step of cutting out multiple semi-completed tips 30 (see FIG. 5) each including the second layer 11 in the middle thereof by cutting from one cut face 21 to the other cut face 22 of the prismatic blank 20, a joining step of joining each of these semi-completed tips 30 to a separately prepared shank 50, and a finishing step of obtaining a completed tip 40 by forming on the semi-completed tip 30 rake faces 41a, 41b, cutting edges 42a, 42b and flanks 43a, 43b.

By employing this manufacturing method, because product yield is extremely high, as is clear from FIG. 2 and FIG. 5, tips can be manufactured in large quantities in expensively. And as a result, the cutting tool can also be manufactured at a low cost.

Figure 10:
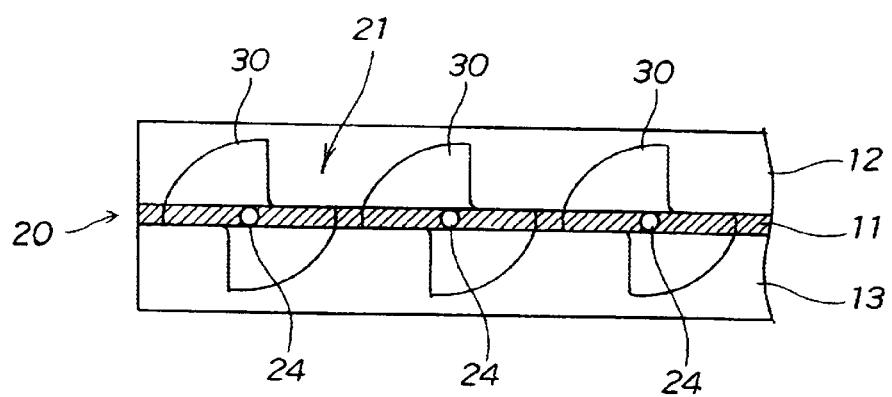
FIG. 10 is a view corresponding to FIG. 5 illustrating how semi-completed tips are cut out from the prismatic blank shown in FIG. 4 to manufacture a tip having a different shape.
Figure 11:
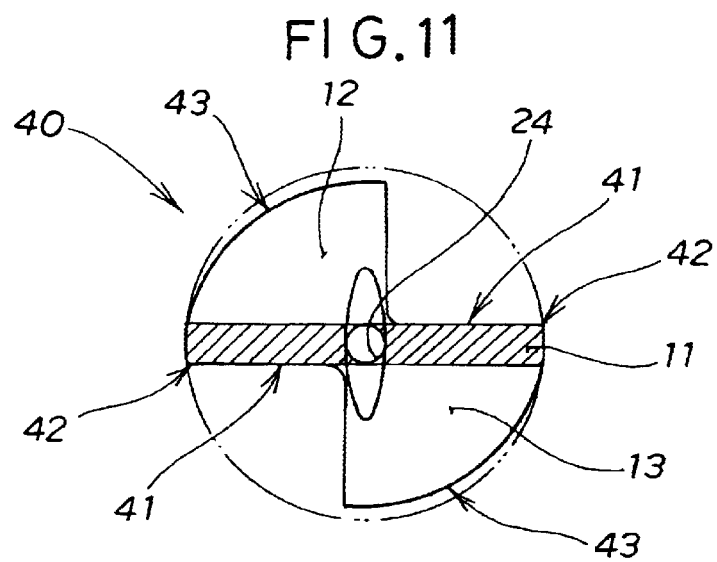
FIG. 11 is a front view of a finished tip made from a semi-completed tip cut out as illustrated in FIG. 10.
Figure 12:
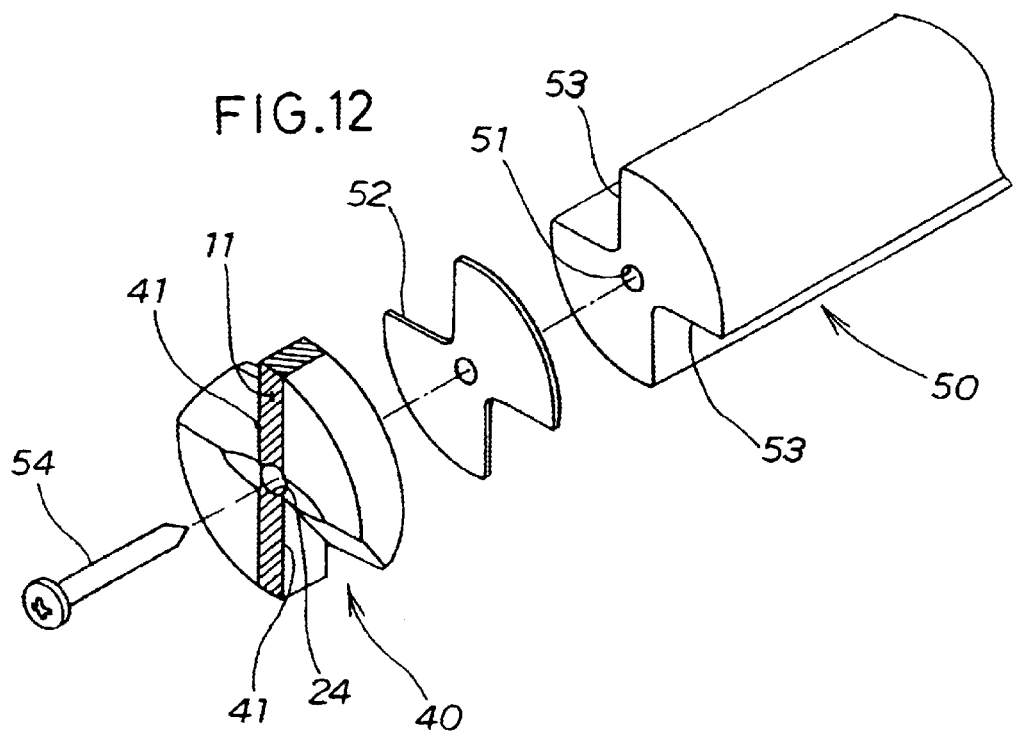
FIG. 12 is an exploded perspective view showing how the same tip is attached to a shank.

FIG. 10 through FIG. 12 illustrate the manufacture of a tip having a different shape from the tip shown in the first preferred embodiment.

FIG. 10 shows how semi-completed tips 30 having a different shape from the semi-completed tips 30 illustrated in FIG. 5 are cut out from the prismatic blank 20 in the same way. Specifically, numerous semi-completed tips 30 are cut out by cutting from one cut face to the other cut face of the prismatic blank 20 having the plurality of oil passages 24, in other words from the front side of the drawing to the rear side, so as to include one of the oil passages 24 each time. This cutting is carried out by wire cut electric discharge machining in the same way as in the case of FIG. 5.

By finishing each of the semi-completed tips 30 thus cut out as shown in FIG. 11, and forming thereon rake faces 41, 41, cutting edges 42, 42 and flanks 43, 43, a completed tip 40 is manufactured according to explanation in FIG. 10. And in this case also as is clear from FIG. 11, the cutting edges 42, 42 are formed on the second layer 11, the hardest part of the tip.

This cutting tip 40 can serve in various uses, but as a typical usage example, as shown in FIG. 12, the tip 40 is fixed to the end of a shank 50 made by forming an oil passage 51 in a round bar of tool steel, finishing the round bar to a predetermined diameter, and forming grooves 53, 53 symmetrically in the bar in its length direction. Preferably a pin 54 is passed through the oil passages 24, 51 to raise the accuracy with which the tip 40 is positioned. The tip 40 is brazed to the end of the shank 50 with brazing filler metal 52, and a cutting tool is obtained.

Thus a method for manufacturing a cutting tip according to this first preferred embodiment includes a first cutting step of cutting out the prismatic blank 20 of rectangular cross-section shown in FIG. 3 by cutting the three-layer laminate 10 shown in FIG. 1 from the top face of the first layer 12 substantially perpendicularly in the order of the first layer 12, the second layer 11 and the third layer 13, a second cutting step of cutting out a semi-completed tip 30 (see FIG. 10) including the second layer 11 in the middle thereof by cutting from one cut face 21 to the other out face 22 of the prismatic blank 20, and a finishing step of obtaining a completed tip 40 by forming on the semi-completed tip 30 the rake faces 41, the cutting edges 42, and the flanks 43 shown in FIG. 11, FIGS. 13A through 13D are views illustrating the manufacture of a lathe tool.

Figure 13A:
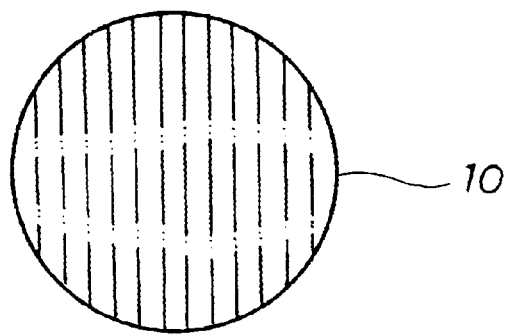
FIGS. 13A, 13B, 13C, and 13D are views illustrating the manufacture of a tip for a lathe tool from a three-layer laminate.

In FIG. 13A, a disc-shaped three-layer laminate 10 is cut in strips along the dotted lines.

Figure 13B:
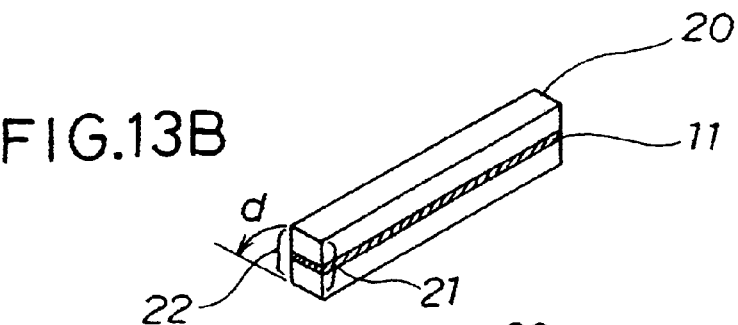

FIG. 13B shows one of the prismatic blanks 20 obtained. For convenience, this prismatic blank 20 is laid on its side in the direction of the arrow d.

Figure 13C:
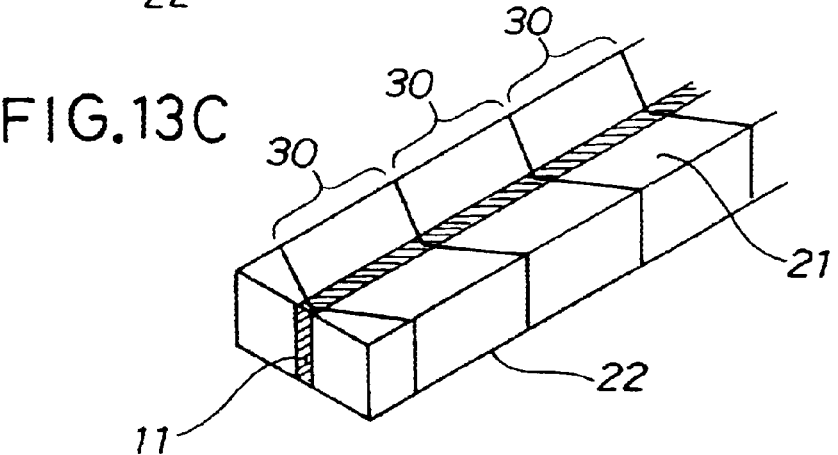

In FIG. 13C, multiple semi-completed tips 30 each including the second layer 11 in the middle thereof are cut out by cutting from one cut face 21 to the other cut face 22 by wire cut electric discharge machining.

Figure 13D:
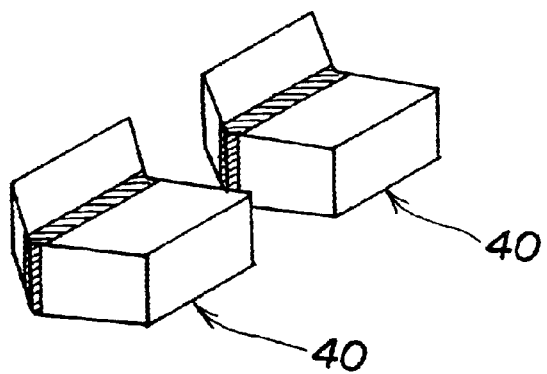

In FIG. 13D, finishing machining is carried out on the semi-completed tips 30 to obtain tips 40.

Figure 14:
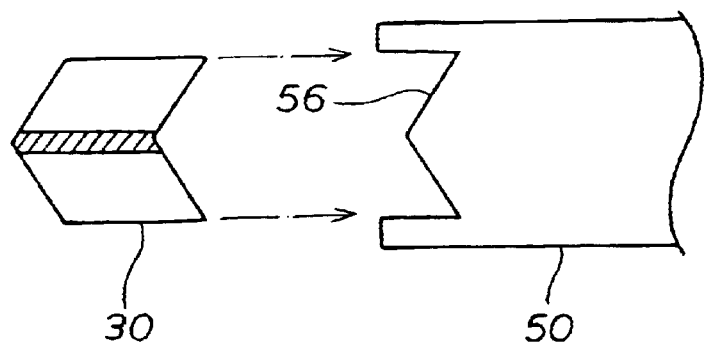
FIG. 14 is a view illustrating how the tip shown in FIG. 13D is attached to a shank.

Next, as shown in FIG. 14, an M-shaped groove 56 is cut in the end of a plate shank 50, the tip 40 is fitted in this M-shaped groove 56, and the two are joined together by brazing to obtain a lathe tool.

Figure 15:
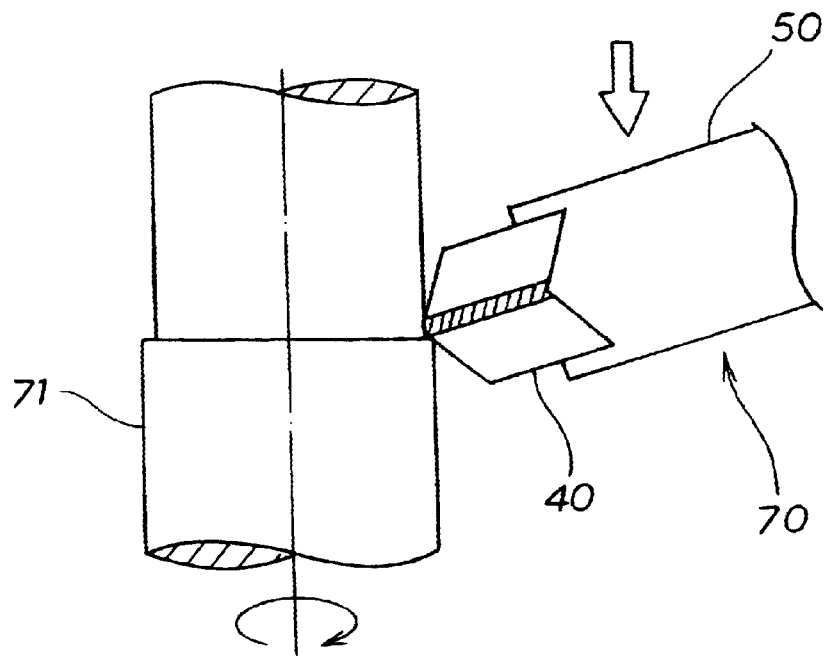
FIG. 15 is a view illustrating a shaft being cut with the lathe tool.

FIG. 15 shows a usage example wherein a shaft 71 is being cut with a lathe tool 70 consisting of the cutting tool obtained in FIG. 14.

Although in FIG. 3 and FIG. 13B the prismatic blank 20 was laid on its side, alternatively the prismatic blank 20 may be cut sideways from one cut face 21 to the other cut face 22 without being laid on its side; that is, it may be cut in any machining attitude.

Figure 16:
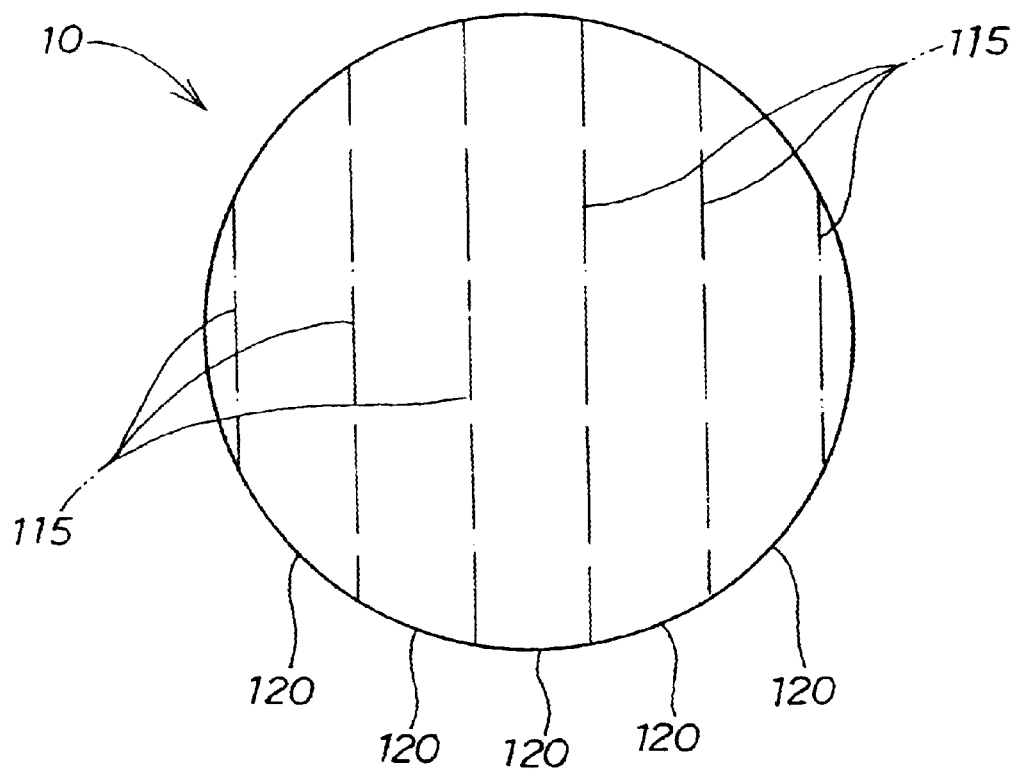
FIG. 16 is a view illustrating how wide prismatic blanks are cut in parallel from a three-layer laminate in the manufacture of a cutting tip of a second preferred embodiment and is a plan view corresponding to FIG. 2.

FIGS. 16 through 21 illustrate the manufacture of a drill constituting a cutting tip pertaining to a second preferred embodiment. FIG. 16 corresponds to FIG. 2: multiple prismatic blanks 120 wider than the prismatic blanks 20 of FIG. 2 are cut out in parallel from a three-layer laminate 110 along cut lines 115. As in the example shown in FIG. 2, in this preferred embodiment also the prismatic blanks 120 can be cut with good yield (for example 90%).

Figure 17:
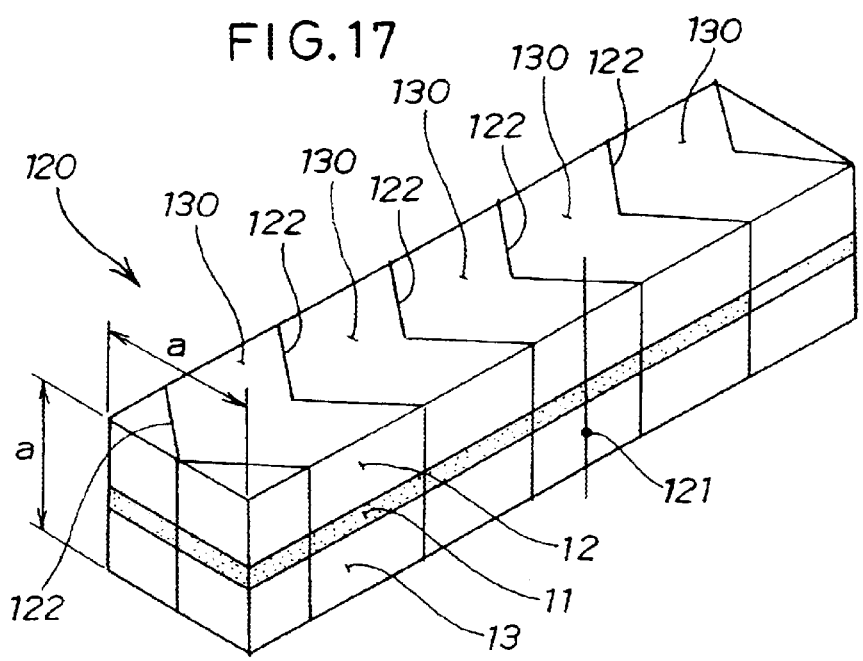
FIG. 17 is a perspective view of a prismatic blank cut out in FIG. 16.

FIG. 17 shows a prismatic blank 120 thus cut out. The prismatic blank 120 is a long-by-narrow member with a square cross-section axa of width a and height a and is a laminate of the first layer 12, the second layer 11 and the third layer 13. Numerous semi-completed tips 130 are obtained by cutting the prismatic blank 120 on a cutting plane 122 bent in plan view in the shape of a dog leg so as to be inclined at a predetermined angle to a cut face 121 formed in FIG. 16.

Figure 18:
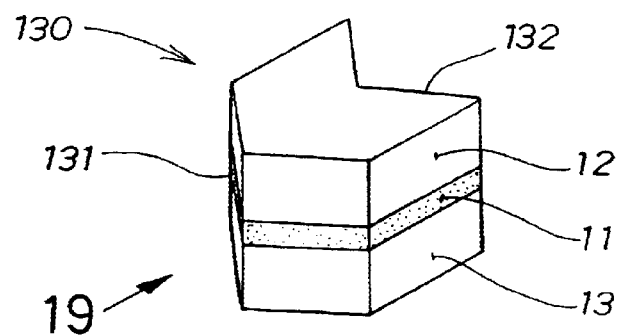
FIG. 18 is a perspective view of a semi-completed tip cut from the prismatic blank shown in FIG. 17.

In FIG. 18, a semi-completed tip 130 thus cut is a piece whose front face 131 is pointed like an arrow outwardly and whose rear face 132 is pointed like an arrow inwardly. This cutting is carried out for example by wire cut electric discharge machining.

Figure 19:
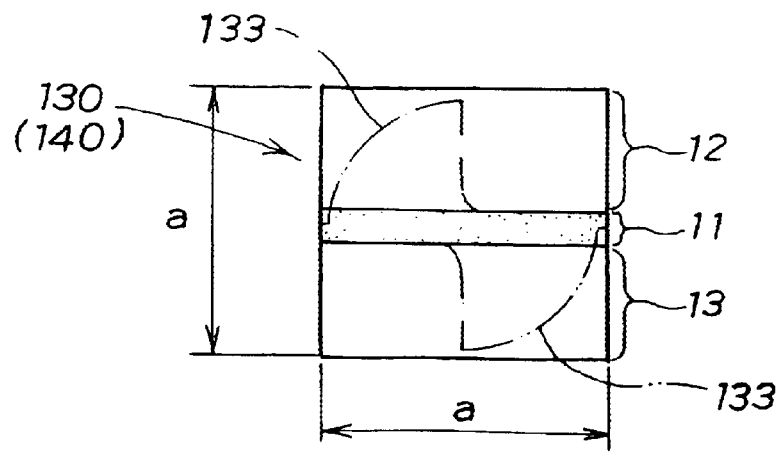
FIG. 19 is a front view of a semi-completed tip seen in the direction of the arrow 19 in FIG. 18.

Next, a completed tip is manufactured from the semi-completed tip 130 shown in FIG. 18. In FIG. 19, the semi-completed tip 130 is cut by electric discharge machining along cut lines 133, from the front face of the figure toward the rear face. The cut lines 133 leave the second layer 11 almost entirely intact but cut greatly into the first layer 12 and the third layer 13. Cutting the semi-completed tip 130 like this produces a tip 140.

Figure 20:
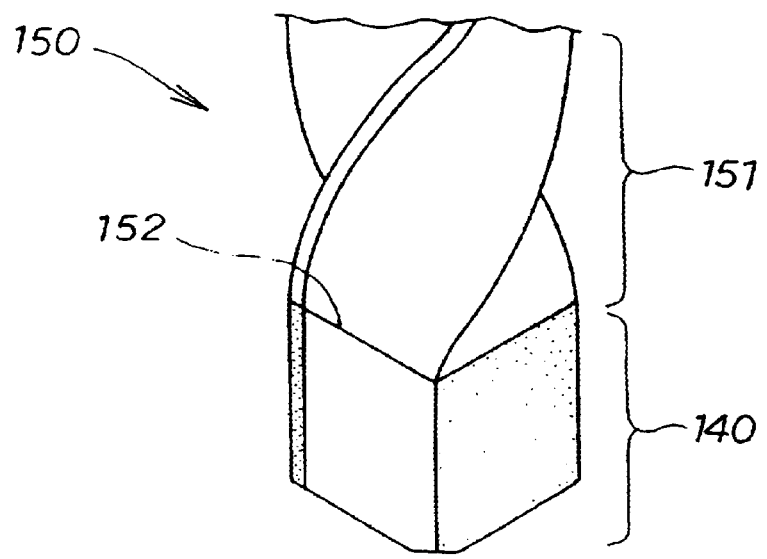
FIG. 20 is a perspective view of the same tip attached to a shank.

FIG. 20 shows the tip 140 of this preferred embodiment attached to a shank. The tip 140 formed in FIG. 19 can be applied to various uses, for example a drill, a thread-cutting tool, an end mill, or a tap. Taking the specific example of a drill, the tip 140 is joined by brazing filler metal 152 to the end of a drill-shaped shank 151 and provided with edges to form a drill 150. That is, as shown in FIG. 21, a drill 150 is manufactured by forming a chisel edge 153, grooves 154, 154, rake faces 155, 155, cutting edges 156, 156 and flanks 157, 157 on the drill 150 shown in FIG. 20.

Figure 21:
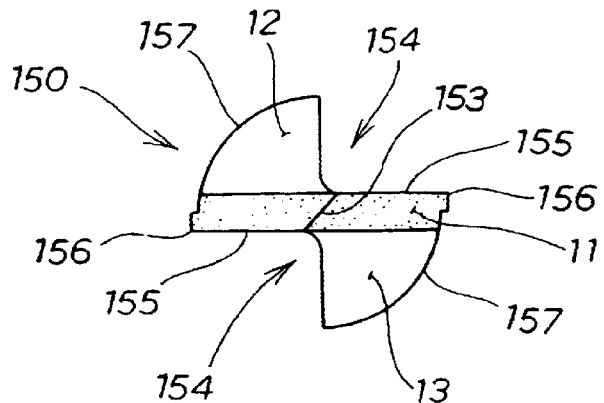
FIG. 21 is a view in the direction of the arrow 21 in FIG. 20.

As is clear from the foregoing description, a method for manufacturing a cutting tip according to this second preferred embodiment, explained here using the example of a drill, includes a first cutting step of cutting out the multiple prismatic blanks 120 shown in FIG. 16 by cutting the three-layer laminate 10 shown in FIG. 1 from the top face of the first layer 12 substantially perpendicularly in the order of the first layer 12, the second layer 11 and the third layer 13, a second cutting step of cutting out the semi-completed tips 130 (see FIG. 17) including the second layer 11 in the middle thereof by cutting the prismatic blanks 120, and a finishing step of obtaining completed tips 140 by forming on each of the semi-completed tips 130 the rake faces 155, the cutting edges 156 and the flanks 157 shown in FIG. 21.

As a result of employing this manufacturing method, as is clear from FIG. 16 and FIG. 17, product yield is extremely high, and tips can be manufactured in large quantities inexpensively.

Also, a method for manufacturing a cutting tool according to this second preferred embodiment, explained here using the example of a drill, includes a preparation step of preparing a three-layer laminate 10 wherein a second layer 11 made of a hard sintered compact of CBN or diamond is sandwiched by a first layer 12 and a third layer 13 made of a tool material such as cemented carbide, a first cutting step of cutting out prismatic blanks 120 of rectangular cross-section by cutting the three-layer laminate 10 from the top face of the first layer 12 substantially perpendicularly in the order of the first layer 12, the second layer 11 and the third layer 13, a second cutting step of cutting out semi-completed tips 130 each including the second layer 11 in the middle thereof by cutting the prismatic blanks 120 along cutting planes 122 bent so that cutting is carried out at a predetermined angle to the cut face 121 formed in the first cutting step, a joining step of joining the semi-completed tips 130 to separately prepared shanks 151, and a finishing step of obtaining completed tips 140 by forming on each of the semi-completed tips 130 the rake faces 155, the cutting edges 156 and the flanks 157. By this manufacturing method a cutting tool such as the drill 150 can be manufactured.

Next, a method for manufacturing a thread-cutting tool from the semi-completed tip 130 shown in FIG. 18 will be described.

Figure 22A:
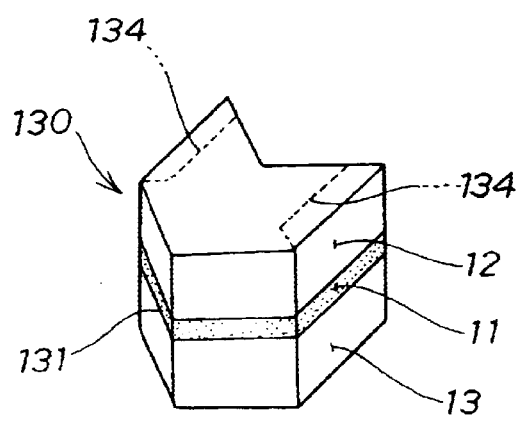
FIGS. 22A and 22B are views illustrating the manufacture of a thread-cutting tool from the semi-completed tip shown in FIG. 18.

As shown in FIG. 22A, the semi-completed tip 130 shown in FIG. 18 is cut along cut lines 134, 134 showing with a broken line. If the semi-completed tip 130 is considered a primary semi-completed tip, then as a result of this cutting a secondary semi-completed tip 135 is obtained as shown in FIG. 22B.

Figure 22B:
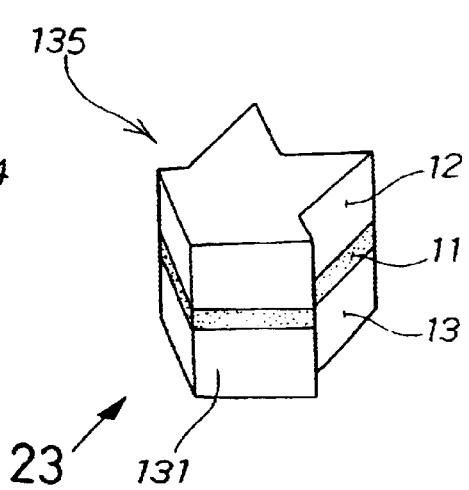
Figure 23:
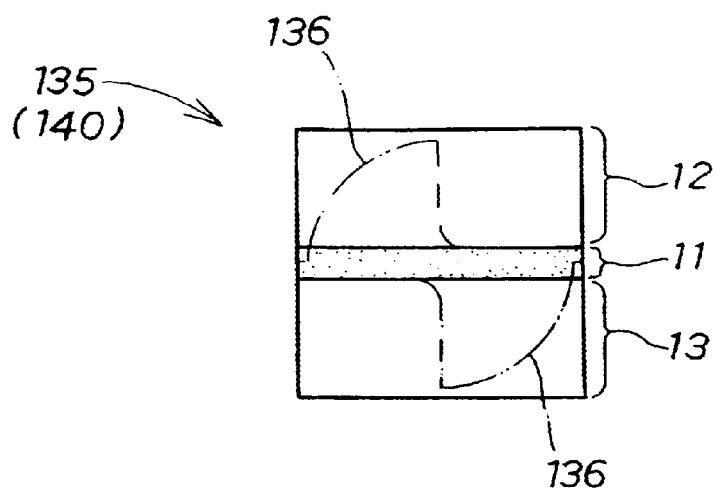
FIG. 23 is a view in the direction of the arrow 23 in FIG. 22B.

Then, as shown in FIG. 23, looking at the outwardly pointing face 131, which is the front face of the secondary semi-completed tip 135 shown in FIG. 22B, the secondary semi-completed tip 135 is cut along Cut lines 136, from the front face toward the rear face of the drawing, by electric discharge machining. The cut lines 136 leave the second layer 11 almost entirely intact but cut greatly into the first layer 12 and the third layer 13. The cut semi-completed tip 130 becomes a tip 140 of a thread-cutting tool.

Figure 24:
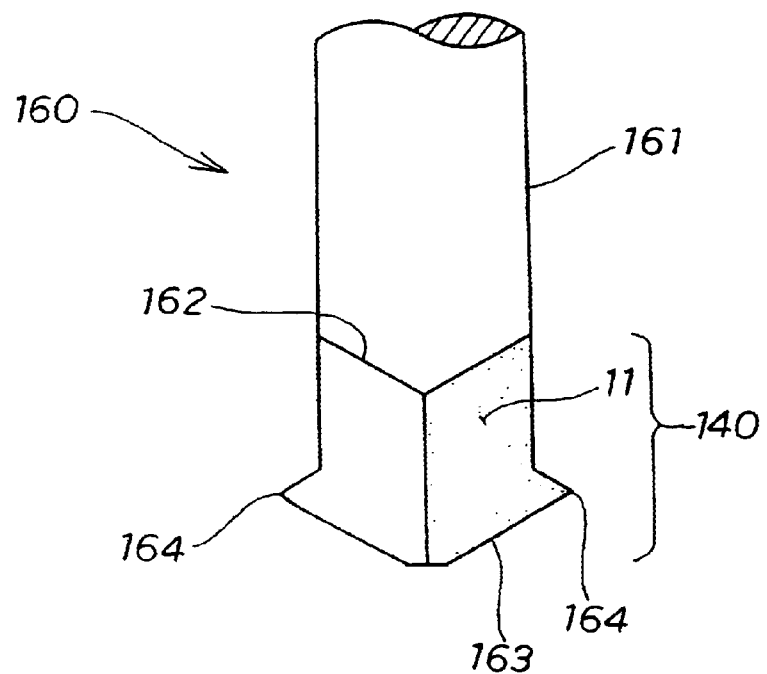
FIG. 24 is a plan view of the thread-cutting tool.

FIG. 24 shows a thread-cutting tool having the tip 140. This thread-cutting tool 160 is made by joining the tip 140 to the end of a shank 161 with brazing filler metal 162 and forming on it an end cutting edge 163 and thread-cutting edges 164, 164.

Next, the manufacture of an end mill will be described, with reference to FIGS. 25 through 28.

Figure 25:
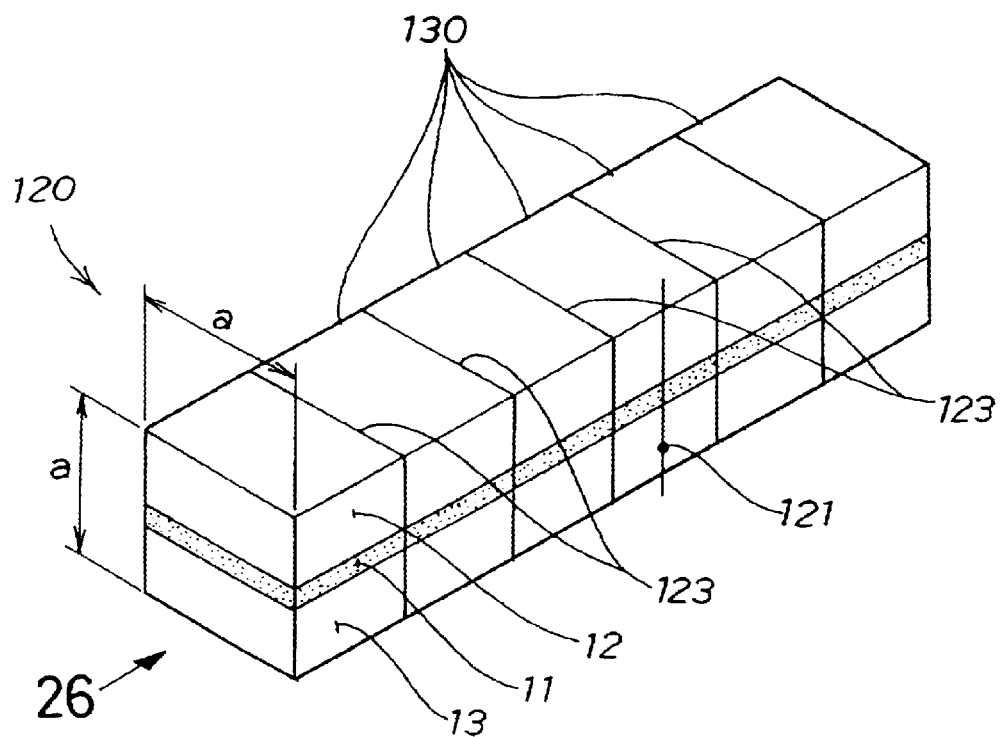
FIG. 25 is a perspective view illustrating a method for cutting a prismatic blank when manufacturing end mills from prismatic blanks cut out from the three-layer laminate shown in FIG. 16.

In FIG. 25, the prismatic blank 120 is a long-by-narrow member with a square cross-section a×a, and is a laminate of the first layer 12, the second layer 11 and the third layer 13. By cutting this prismatic blank 120 on multiple cutting planes 23 orthogonal to the cut face 121 shown in FIG. 25, multiple semi-completed tips 130 shaped like dice are obtained.

Figure 26:
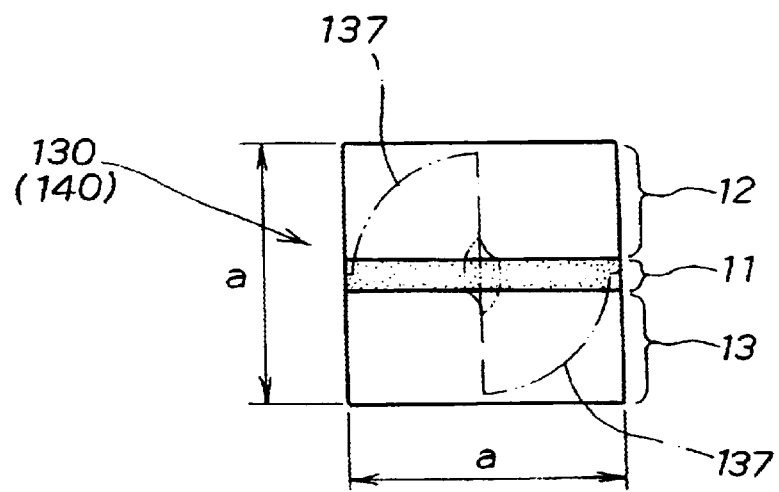
FIG. 26 is a view in the direction of the arrow 26 in FIG. 25.

In FIG. 26, a semi-completed tip 130 is cut by electric discharge machining along cut lines 137, from the front side toward the rear side of the drawing. The cut lines 137 leave the second layer 11 almost entirely intact but cut greatly into the first layer 12 and the third layer 13. The semi-completed tip 130 thus cut becomes a tip 140.

Figure 27:
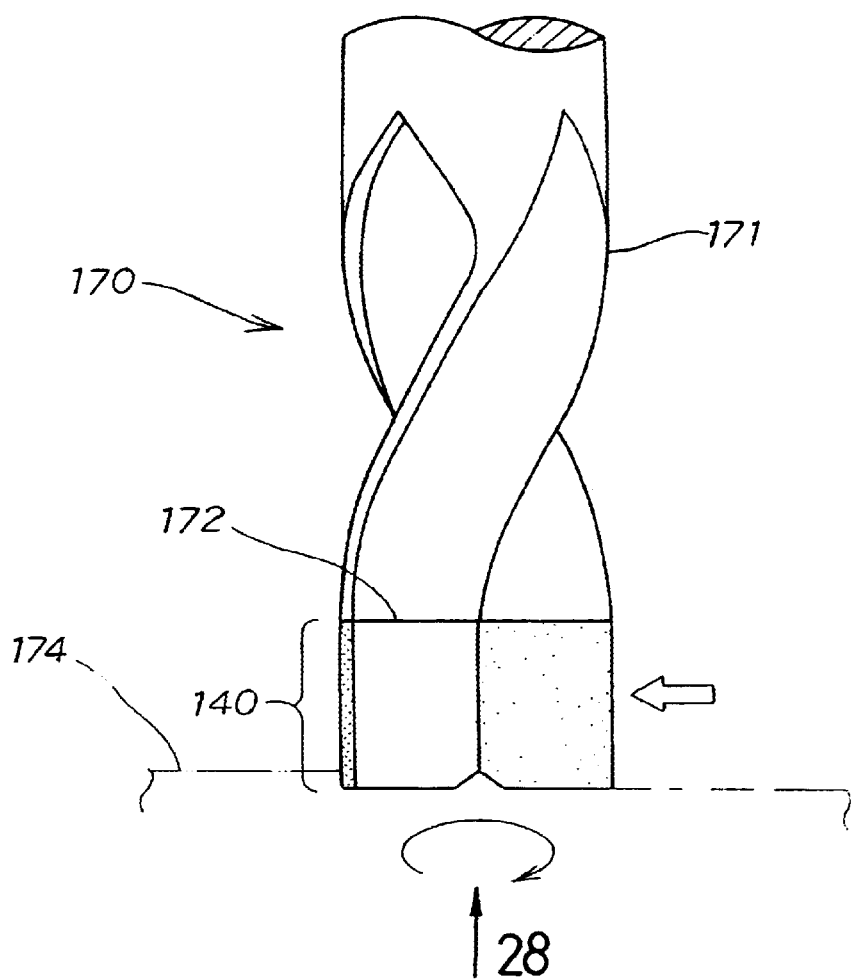
FIG. 27 is a front view of an end mill.

Then, the tip 140 obtained by cutting in FIG. 26 is joined with brazing filler metal 172 to a shank 171 shown in FIG. 27 and an end mill 170 is obtained. The end mill 170 is a cutting tool for cutting a workpiece 174 by rotating while being fed as shown by the large arrow.

Figure 28:
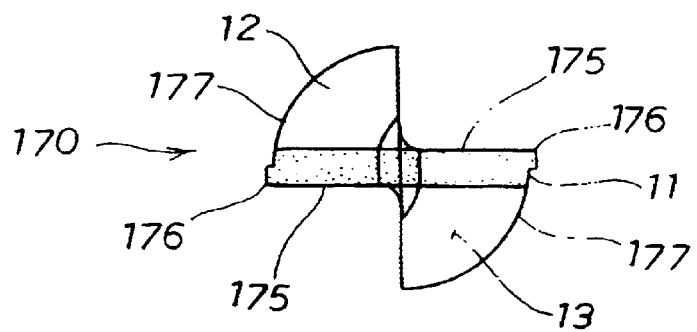
FIG. 28 is a view in the direction of the arrow 28 in FIG. 27.

As shown in FIG. 28, rake faces 175, 175, cutting edges 176, 176 and flanks 177, 177 are formed on the end of the end mill 170.

Discussion will be made next as to the manufacture of a tap with reference to FIGS. 29 through 33.

Figure 29:
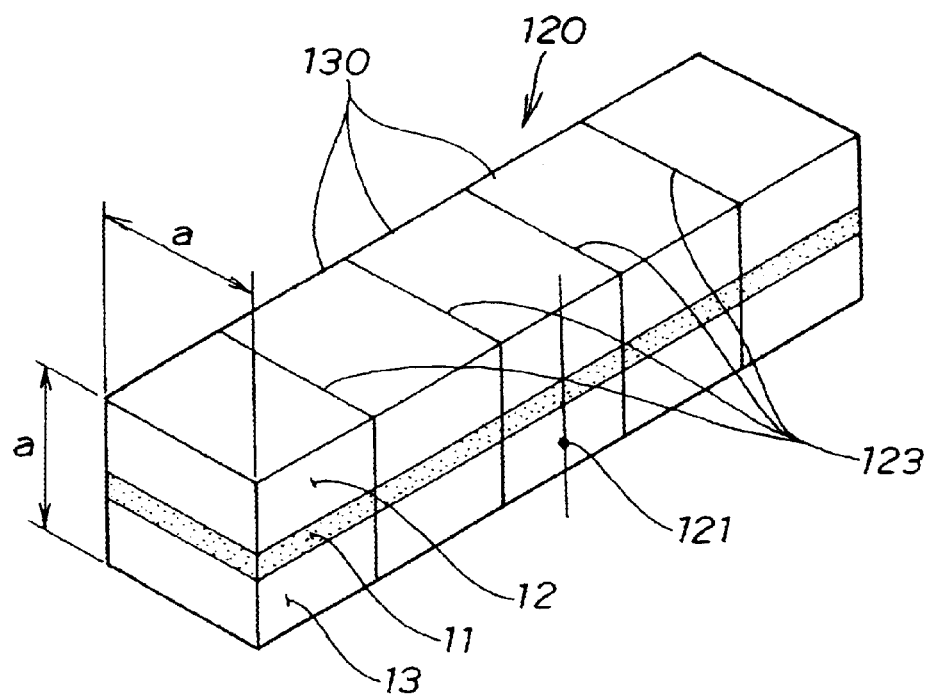
FIG. 29 is a perspective view illustrating a method for cutting a prismatic blank when manufacturing taps from prismatic blanks cut out from the three-layer laminate shown in FIG. 16.

In FIG. 29, the prismatic blank 120 is a long-by-narrow member with a square cross-section a×a and is a laminate of the first layer 12, the second layer 11 and the third layer 13. By cutting this prismatic blank 120 on multiple cutting planes 123 orthogonal to the cut face 121 shown in FIG. 29, multiple semi-completed tips 130 shaped like dice are obtained.

Figure 30:
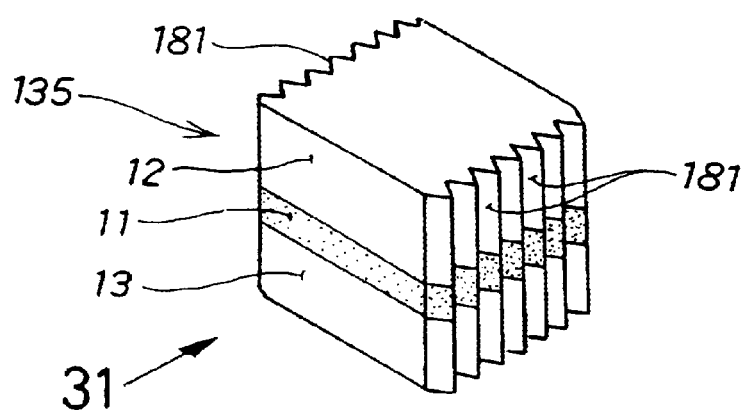
FIG. 30 is a perspective view of a semi-completed tip cut from the prismatic blank shown in FIG. 29.

Then, on both side faces of the primary semi-completed tip 130 obtained in FIG. 29, sawtooth parts 181, 181 are formed as shown in FIG. 30, and a secondary semi-completed tip 135 is obtained.

Figure 31:
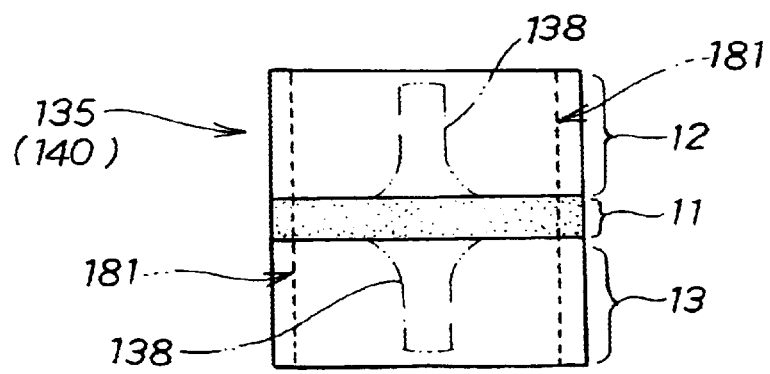
FIG. 31 is a view in the direction of the arrow 31 in FIG. 30.

In FIG. 31, the secondary semi-completed tip 135 is cut by electric discharge machining along cut lines 138, from the front side toward the rear side of the drawing. The cut lines 138 leave the second layer 11 almost entirely intact but cut greatly into the first layer 12 and the third layer 13. The secondary semi-completed tip 135 thus cut becomes a tip 140.

Figure 32:
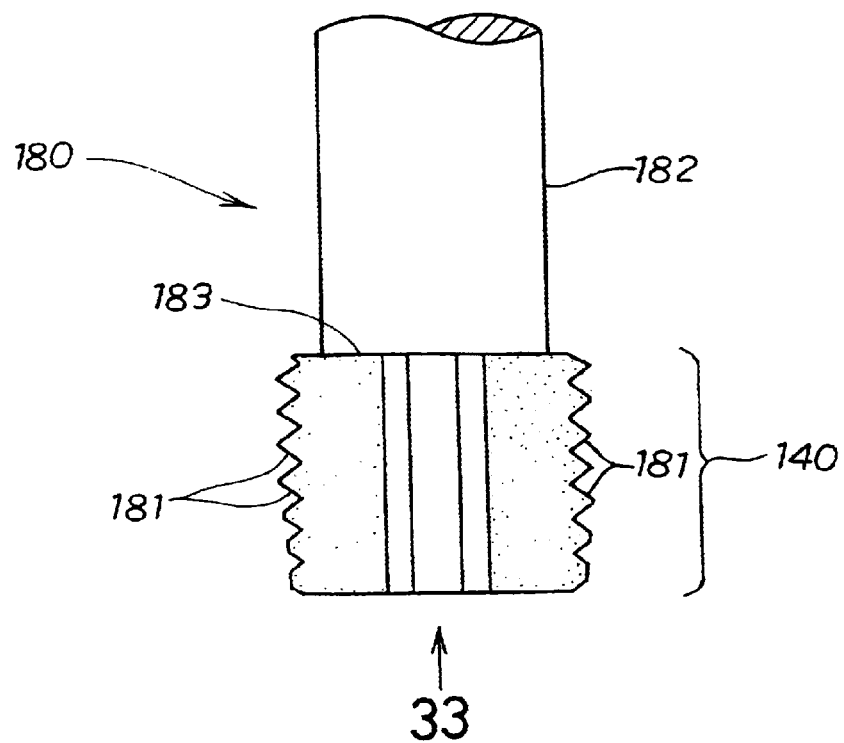
FIG. 32 is a front view of a tap.

The tip 140 obtained in FIG. 31 is joined to a shank 182 with brazing filler metal 183 and a tap 180 is obtained, as shown in FIG. 32.

Figure 33:
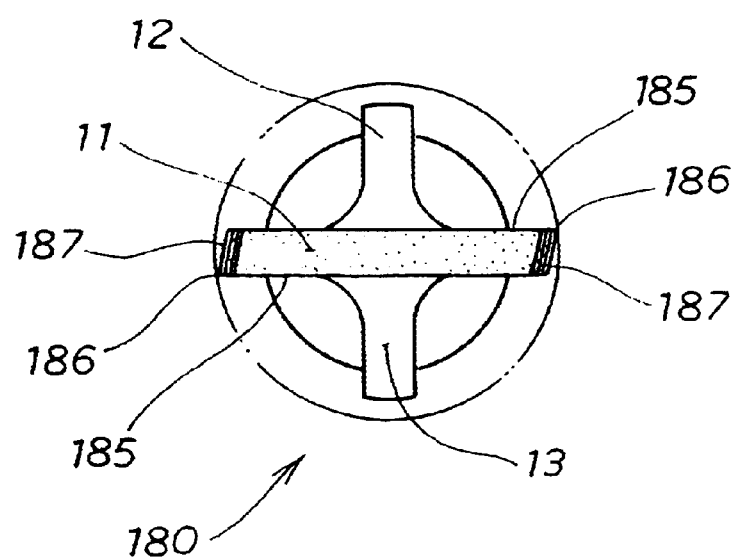
FIG. 33 is a view in the direction of the arrow 33 in FIG. 32.

As shown in FIG. 33, rake faces 185, 185, cutting edges 186, 186 and flanks 187, 187 are formed on the end of the tap 180.

A cutting tip pertaining to the second preferred embodiment described above can be used as a tip of a cutting tool such as a milling cutter or a lathe tool as well as for a drill, a thread-cutting tool, an end mill or a tap as described in this preferred embodiment Thus, the form of use of a cutting tip manufactured in accordance with the invention can be determined freely.

Next, a method for using the cutting tool 60 shown in FIG. 8 and FIG. 9 as a thread-cutting tool and cutting a thread using this thread-cutting tool 60 will be described.

FIGS. 34A through 34F illustrate steps in a thread-cutting process using the thread-cutting tool 60.

FIG. 34A: The rotating thread-cutting tool 60 is brought to face a cored hole 62 and machining of a prepared hole is started.

FIG. 34B: The internal diameter of the prepared hole 63 is approximately the same as the external diameter of the thread-cutting tool 60. Advancing (lowering) of the thread-cutting tool 60 is stopped when it reaches a predetermined depth.

FIG. 34C: The axis 66 of the thread-cutting tool is offset by a distance δ from the threaded hole axis 64. Because the thread-cutting tool 60 is rotating, the wall forming the prepared hole 63 can be cut into easily.

Figure 34F:
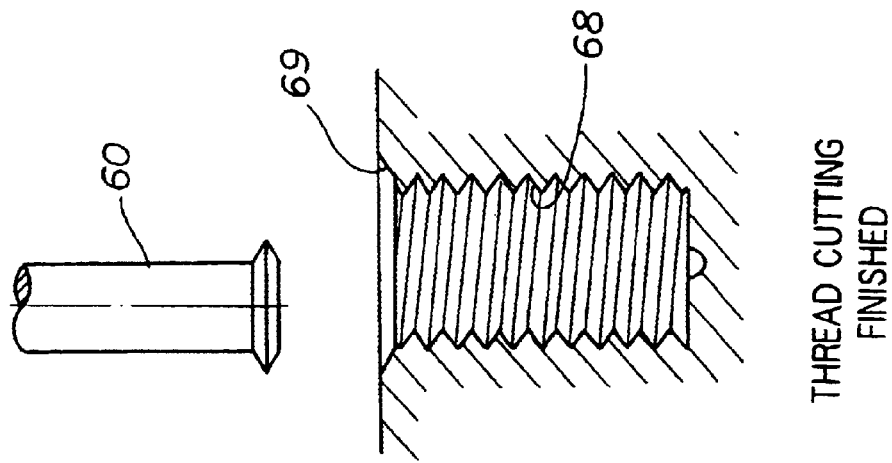
Figure 34E:
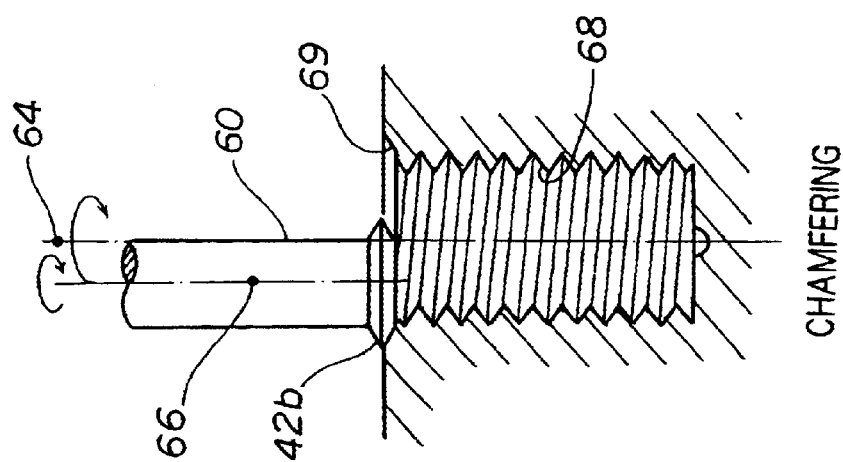
Figure 34D:
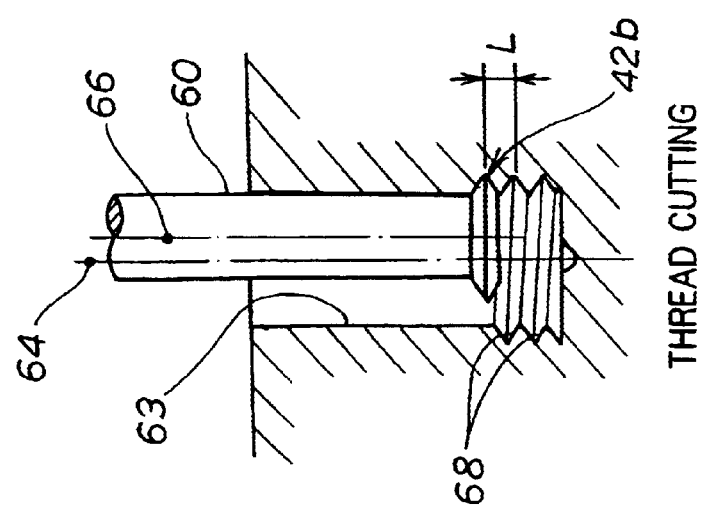

FIG. 34D: A thread 68 is cut with the thread cutting edge 42b by the thread-cutting tool 60 being gradually withdrawn in correspondence with the lead L of the thread 68 while the axis 66 of the thread-cutting tool is rotated about the threaded hole axis 64.

FIG. 34E: When the thread cutting edge 42b of the thread-cutting tool 60 reaches the entrance of the thread 68, the axis 66 of the thread-cutting tool is offset further from the threaded hole axis 64 to form a chamfer 69.

FIG. 34F: The thread-cutting tool 60 is removed and thread-cutting is ended.

Figure 35A:
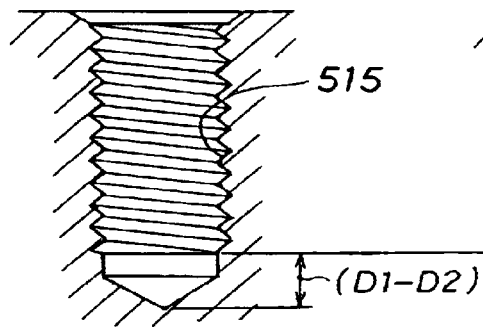
FIGS. 35A and 35B illustrate a comparison between a threaded hole in related art and a threaded hole formed by a threading method according to the invention.

FIG. 35A is copied from FIG. 58C and shows a bread 515 manufactured by a thread-cutting method of related art, including an unthreaded part of depth (D1–D2).

Figure 35B:
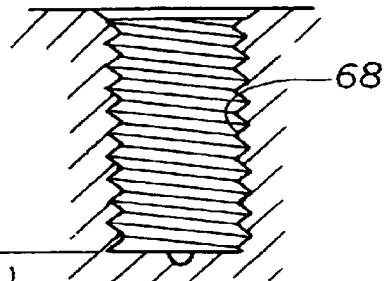

FIG. 35B is copied from FIG. 34F and shows a thread 68 manufactured by the thread-cutting method of this preferred embodiment, in which there is no unthreaded part of depth (D1–D2).

Accordingly, with the method of this preferred embodiment, the casting can be made thinner. That is, because it is not necessary to increase it thickness to form the thread, the casting can be made lighter.

FIGS. 36A–C illustrate another preferred embodiment of a thread-cutting tool, having a different structure from the cutting tool 60. Parts in these figures, which are the same as parts in FIG. 8 and FIG. 9, have been given the same reference numerals.

As shown in FIG. 36A, a thread-cutting tool 60A has a tip 40 attached by brazing filler metal 52 to a shards 50. On the shank 50 side of the tip 40, a flat drag 75 of smaller diameter than the thread-cutting edge and 42b and larger diameter than the shank 50 is formed.

As shown in FIG. 36B, when the tool is seen from the front, the second layer 11 is a narrow band passing through the center of rotation of the tool. End cutting edges 42a, 42a and thread-cutting edges 42b, 42b are formed in this narrow band. The second layer 11 is reinforced on both sides by the first layer 12 and the third layer 13.

As shown in FIG. 36C, flat drags 75, 75 are formed on the second layer 11. The second layer 11 is reinforced on both sides by the first layer 12 and the third layer 13.

Next, a process for cutting a thread using the thread-cutting tool 60A shown in FIG. 36A will be described with reference to FIGS. 37A trough 37F.

FIG. 37A: First, the thread-cutting tool 60A, rotating at a predetermined speed, is brought to face a cored hole 62.

FIG. 37B: Then, by cutting the entrance of the cored hole 62 with the thread-cutting tool 60A, a chamfer 69 is formed.

FIG. 37C: The tool axis 66 is offset from the threaded hole axis 64 by a predetermined distance δ. Then, the thread-cutting tool 60A is turned about the threaded hole axis 64 while being rotated, and also the thread-cutting tool 60A is advanced (moved downward in the drawing) in correspondence with the lead of the thread 68. In this way, a thread 68 is formed with the cutting edge 42b in the wall of the cored hole 62.

Figure 37F:
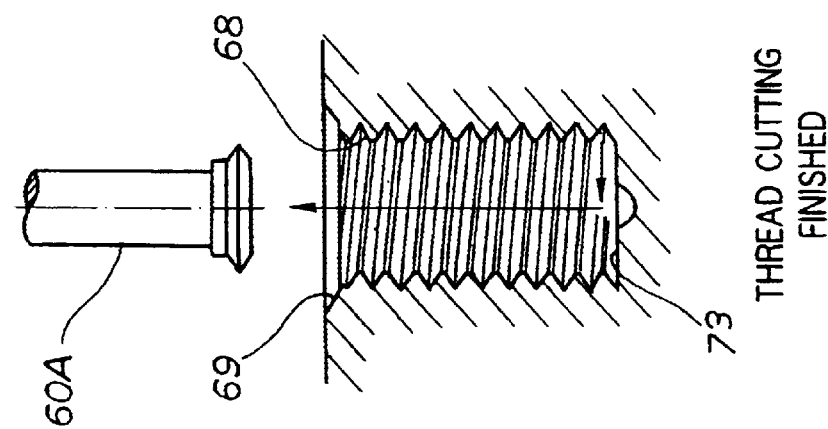
Figure 37E:
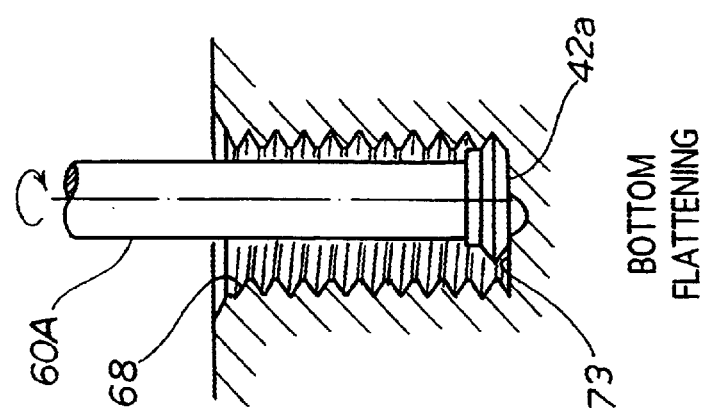
Figure 37D:
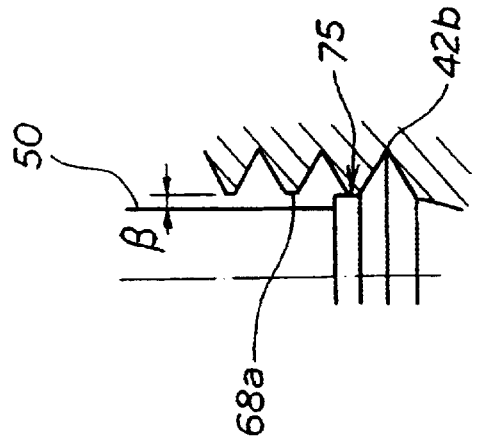

FIG. 37D: (This is a detail view of the part A in FIG. 37C.) Immediately after the thread is cut with the thread cutting edge 42b, and specifically ½ of the lead of the thread later, that is, ½ of a rotation of the tool later, the crest 68a of the ridge of the thread is cut by the flat drag 75. As a result, a gap β is maintained between the crest 68a of the ridge of the thread and the shank 50. If this cut were not carried out, the shank 50 would make contact with the crest of the ridge and both the thread and the shank 50 would be damaged. When, however, as in this example, the crest 68a of the ridge of the thread is dragged (made flat) immediately after the thread is cut, this kind of trouble does not arise.

In FIG. 37E, after the thread 68 is cut to a predetermined depth, the bottom 73 of the threaded hole is finished and flattened by the end cutting edge 42a.

In FIG. 37F, the thread-cutting tool 60A is removed. Because no special movement is needed for this removal step, that is, when withdrawing the thread-cutting tool 60A, the thread-cutting tool 60A can be removed swiftly.

Whereas in the preferred embodiment illustrated in FIGS. 34A through 34F a prepared hole was made in the advancing movement of the thread-cutting tool and thread-cutting was carried out the a withdrawing movement, in the preferred embodiment illustrated in FIGS. 37A through 37F thread-cutting is performed in the advancing movement without a prepared hole being made. And since withdrawal consists of just removing thread-cutting tool, rapid withdrawal is possible, and the time required for thread-cutting can be greatly shortened.

The thread-cutting tool of this preferred embodiment is ideal for the thread-cutting of aluminum alloy castings. And since aluminum alloy is soft and its cutting resistance is relatively low, a satisfactory life of the thread-cutting tool can be expected. However, thread-cutting in various other castings, such as gray cast iron (FC), ductile cast iron (FCD), and stainless steel castings (SCS), or in resin or copper, can also be carried out with the thread-cutting tool of this preferred embodiment.

Next, a thread-cutting tool illustrating another preferred embodiment will be described.

Figure 38:
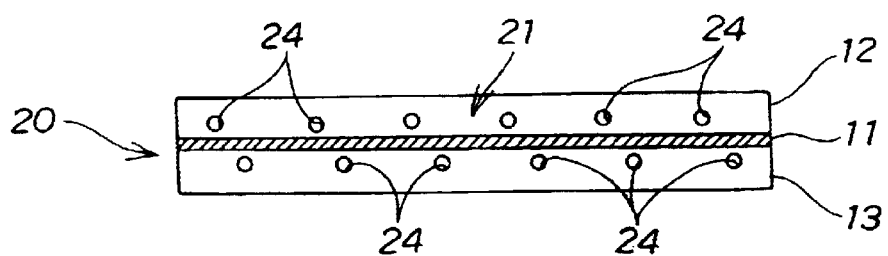
FIG. 38 is a front view corresponding to FIG. 4 of a prismatic blank, showing an example of oil passages being provided in a first layer and a third layer.

FIG. 38 is a view corresponding to FIG. 4, showing a prismatic blank of the first preferred embodiment. Parts the same as in the first preferred embodiment have been given the same reference numerals.

In this preferred embodiment, a plurality of oil passages 24 are made at a predetermined pitch in each of the first layer 12 and the third layer 13 of the prismatic blank 20. The oil passages 24 in the first layer 12 and the oil passages 24 in the third layer 13 are disposed alternately. Specifically, these holes are made by electric discharge machining using a pipe electrode from the cut face 21 to the cut face 22, or from the front side of the drawing toward the rear.

Figure 39:
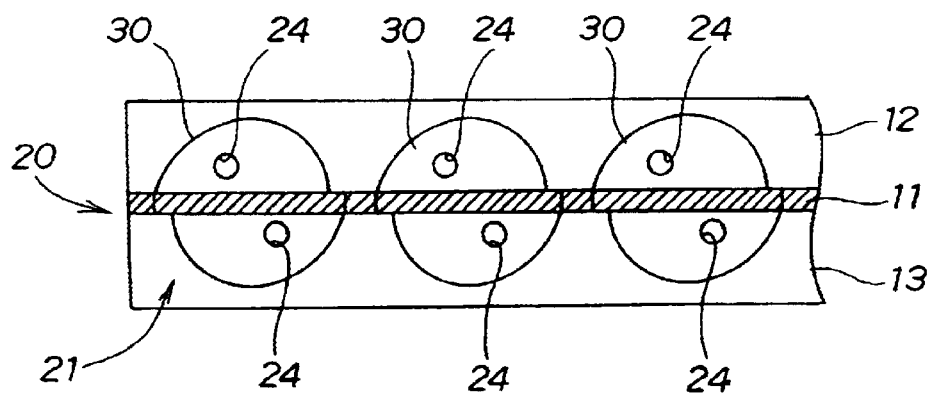
FIG. 39 is an enlarged partial front view of the prismatic blank shown in FIG. 38, illustrating how semi-completed tips are cut out from the prismatic blank.

In FIG. 39, numerous semi-completed tips 30 are cut out by the prismatic blank 20 being cut from one cut face 21 to the other cut face, or from the front of the drawing toward the rear, so as to include one oil passage 24 disposed in the first layer 12 and one oil passage 24 disposed in the third layer 13. Specifically, they are cut out by wire cut electric discharge machining.

Figure 40:
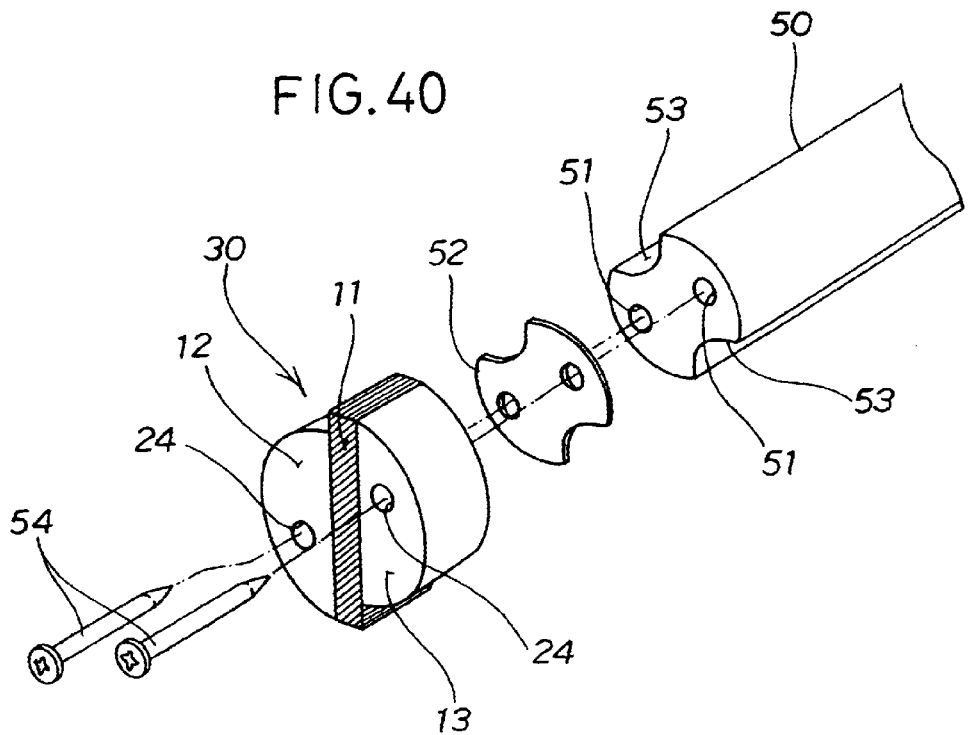
FIG. 40 is an exploded perspective view showing how a semi-completed tip cut out as shown in FIG. 39 is attached to a shank.
Figure 41:
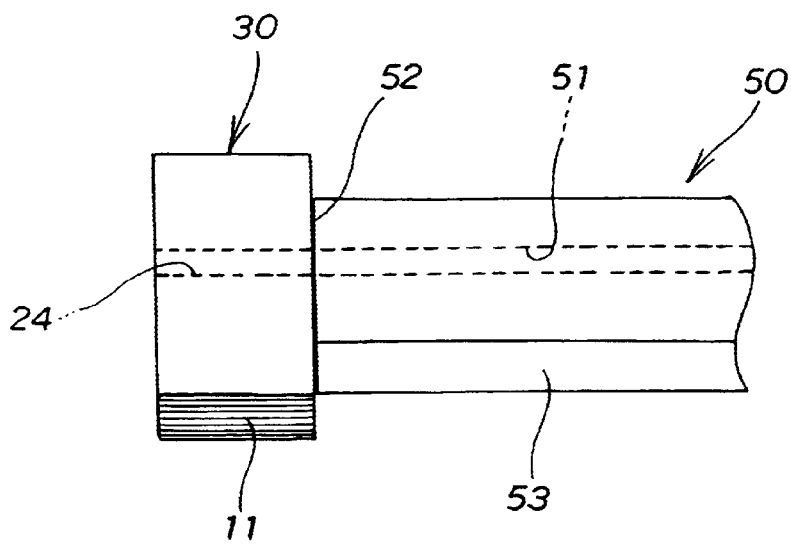
FIG. 41 is a side view of the shank and the semi-completed tip joined together.

In FIG. 40, two oil passages 51, 51 are made in the length direction of a round bar of tool steel to serve as a shank 50 so as to correspond to the oil passages 24, 24 provided in the first layer 12 and the third layer 13, and the round bar is finished to a predetermined diameter and has grooves 53. 53 formed in two opposite sides thereof. A semi-completed tip 30 is brought to the end of the shank 50, preferably the positioning accuracy of the semi-completed tip 30 is raised by pins 54, 54 being passed through the oil passages 24, 24, 51, 51, and the semi-completed tip 30 is brazed to the shank 50 with brazing filler metal 52. The semi-completed tip 30 joined to the end of the shank 50 with brazing filler metal 52 is shown in FIG. 41.

Figure 42:
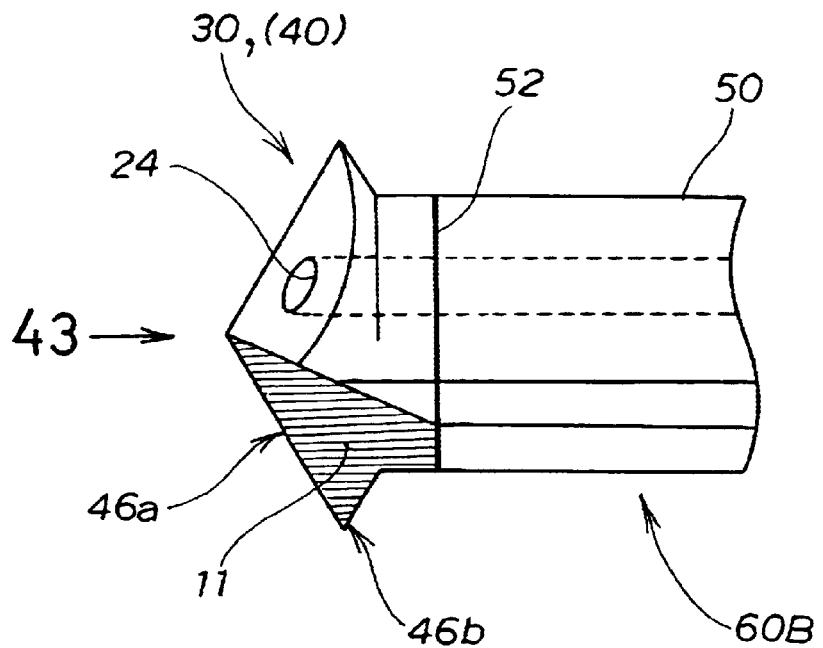
FIG. 42 is a side view of a thread-cutting tool made by forming a thread-cutting edge on the semi-completed tip.
Figure 43:
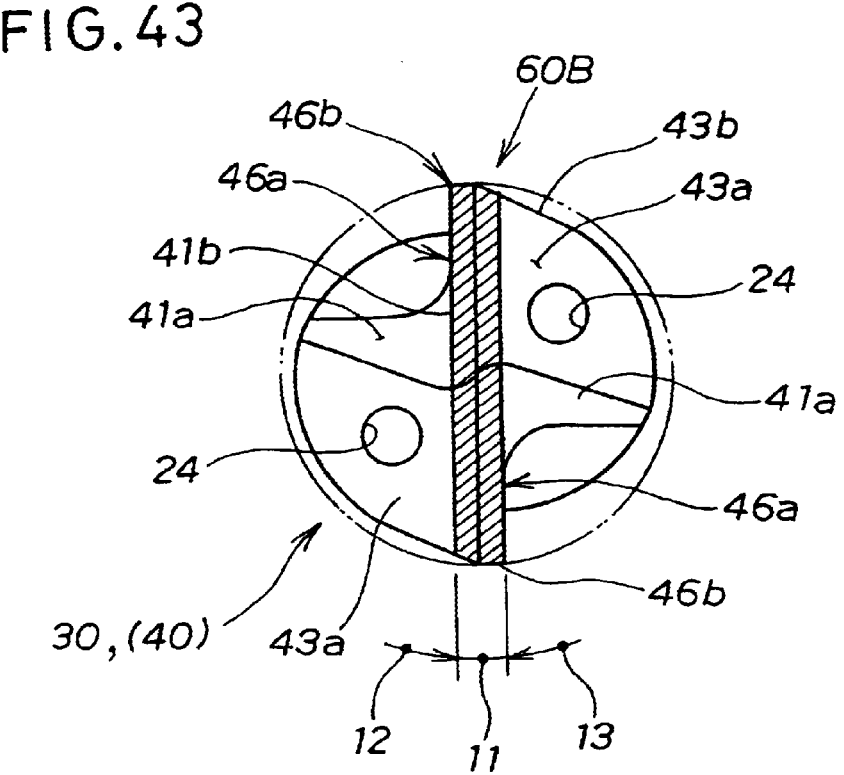
FIG. 43 is a front view of the thread-cutting tool seen in the direction of the arrow 43 in FIG. 42.

In FIG. 42 and FIG. 43, the tip 40 is finished by rake faces (a front rake face 41a and a side rake face 41b), cutting edges (a drill edge 46a and a thread-cutting edge 46b) and flanks (a front flank 43a and a side flank 43b) being formed on the semi-completed tip 30.

As shown in FIG. 43, when this thread-cutting tool 60B is seen from the front, the second layer 11 is a narrow band passing through the center of rotation of the tool, the drill edge 46a and the thread-cutting edge 46b are formed in this narrow band, and the second layer 11 is reinforced on both sides by the first layer 12 and the third layer 13.

Because the oil passages 24, 24 open at the front flanks 43a, 43a, an ample flow of cutting oil can be supplied to the part of the workpiece being cut.

Next, a thread-cutting process using the thread-cutting tool 60B of this preferred embodiment shown in FIG. 42 and FIG. 43 will be described on the basis of FIGS. 44A through 44F.

FIG. 44A: The rotating thread-cutting tool 60B is brought to face a casting 61, and machining of a prepared hole is started. A prepared hole can be machined with the drill edge 46a.

FIG. 44B: The internal diameter of the prepared hole 63 is approximately the same as the external diameter of the thread-cutting tool 60B. Advancing (descending) of the thread-cutting tool 60B is stopped when it reaches a predetermined depth.

FIG. 44C: The axis 66 of the thread-cutting tool is offset from the threaded hole axis 64 by a distance δ. Because the thread-cutting tool 60B is rotating, it can easily cut into the wall of the prepared hole 63.

FIG. 44D: A thread 68 is cut with the thread cutting edge 42b by the thread-cutting tool 60B being gradually withdrawn in correspondence with the lead L of the thread 68 while the axis 66 of the thread-cutting tool 60B is rotated about the threaded hole axis 64.

FIG. 44E: When the thread-cutting edge 46b of the thread-cutting tool 60B reaches the entrance of the thread 68, the axis 66 of the thread-cutting tool is offset further from threaded hole axis 64 to form a chamfer 69.

FIG. 44F: The thread-cutting tool 60B is removed and thread-cutting is ended.

FIGS. 45A and 45B show for comparison completed threads of related art and this preferred embodiment.

FIG. 45A is a comparison example and is copied from FIG. 58C and shows a thread 515 manufactured by a thread-cutting method of related art of depth D1.

FIG. 45B is copied from FIG. 44F and shows a thread 68 manufactured by the thread-cutting method of the present preferred embodiment, of depth D3.

As is clear from these figures, the depth D3 is shallower than the depth D1, and thus with the present preferred embodiment it is possible to make the depth of a threaded hole shallower by (D1–D3) than in related art. And therefore, with the method of this preferred embodiment, it is possible to make the casting thinner. That is, because it is not necessary to increase its thickness to form the thread, the casting can be made lighter.

Next, with reference to FIGS. 46A through 46C, discussion will be made as to steps in a process for forming a threaded through hole in a casting as a workpiece. These figures includes top plan views at upper levels thereof.

FIG. 46A: The thread-cutting tool 60B is brought into confronting relation to the casting 82 as the workpiece for starting the machining of a prepared hole in the casting 82.

FIG. 46B: A prepared through hole 83 is formed in the casting 82 by means of the drill edge 46a, whereupon a burr 85 is produced at a peripheral edge of an outlet 84 of the prepared hole 83. The burr 85 is a small or thin piece of uncut remains The prepared hole 83 has an inside diameter substantially equal to an outer diameter of the thread-cutting tool 60B.

FIG. 46C: The central axis 66 of the thread-cutting tool 60B is caused to offset a distance δ1 from the threaded hole axis 64. This is followed by ascending the tool 60B to carry out chamfering with a back 46c (part of the thread-cutting edge 46b) of the drill edge 46a. That is, a chamfer 86 is provided at the outlet 84 of the prepared hole 83 by causing the tool 60B to revolve about the threaded hole axis upon rotation of the tool 60B on its axis.

Since chamfering of the outlet 84 can thus be effected continuously with the formation of the prepared hole 83, it becomes unnecessary to change the tool to another for chamfering.

Figure 46D:
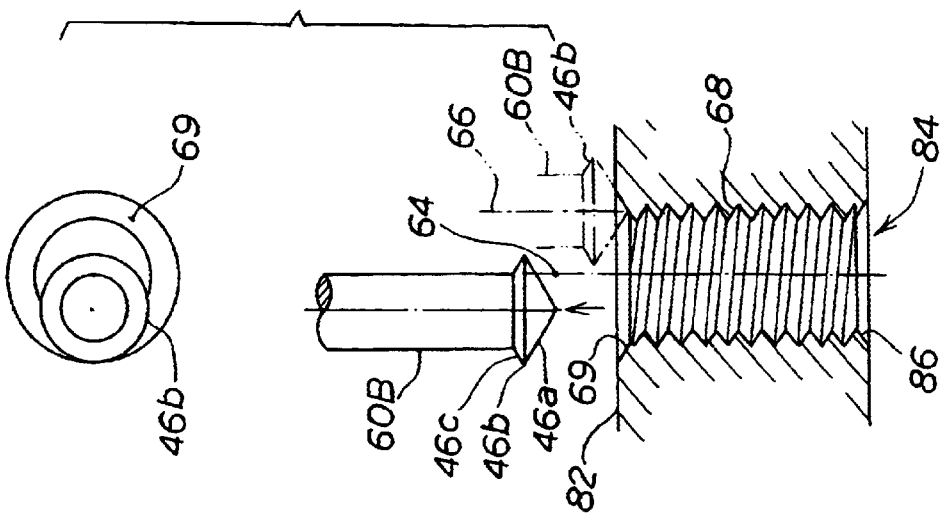
Figure 46E:
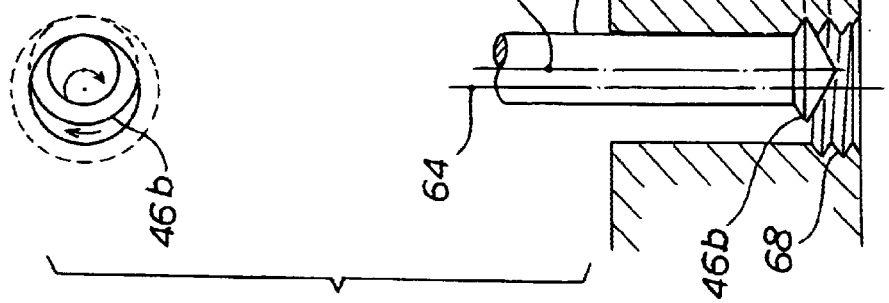

FIG. 46D: An offset of the central axis 66 of the thread-cutting tool 60B relative to the threaded hole axis 64 is changed to δ. In this state, threads are cut in the prepared hole 83 by means of the thread-cutting edge 46b FIG. 46E: The thread-cutting tool 60B is gradually pulled upwardly in correspondence with the lead L of the threaded portion 68 while rotating the thread-cutting tool 60B about the threaded hole axis 64, thereby forming the threaded portion 68 by means of the thread-cutting edge 46b.

Figure 46F:
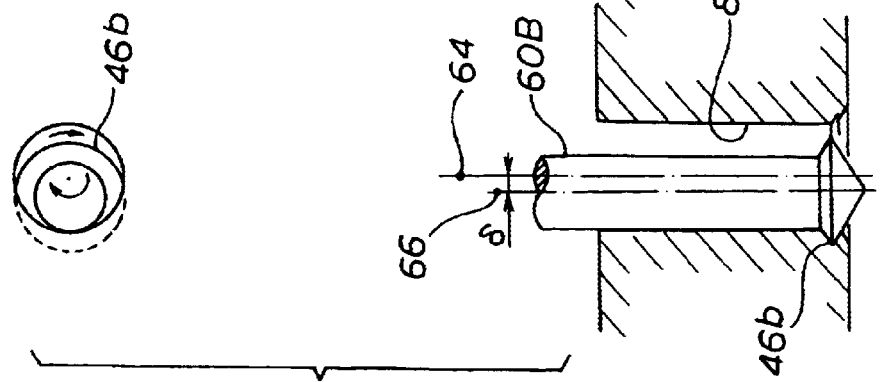

FIG. 46F: Upon completion of the thread cutting, the thread-cutting tool 60B is caused to be largely offset from the threaded hole axis 64. Thereafter, a chamfer 69 is provided at an inlet of the threaded hole. Finally, the thread-cutting tool 60B is removed to thereby complete the thread cutting.

As explained above, since the chamfer 86 is provided at the outlet 84 of the prepared hole 83 by using the back 42c (part of the thread-cutting edge 46b) of the drill edge 46a of the tool 60B, the outlet 84 has no burrs formed thereat.

The thread-cutting tool of this preferred embodiment is ideal for the thread-cutting of aluminum alloy castings. And since aluminum alloy is soft and its cutting resistance is relatively low, a satisfactory life of the thread-cutting tool can be expected. However, thread-cutting in various other castings, such as gray cast iron (FC), ductile cast iron (PCD), and stainless steel castings (SCS), or in resin or copper, can also be carried out with the thread-cutting tool of this preferred embodiment.

And in this preferred embodiment, two oil passages were made, each extending from the shank to the tip. If a pair of oil passages are made symmetrically about the center of rotation like this, the rotational balance of the thread-cutting tool can be made good. However, there may alternatively be one or three or more oil passages, the number of oil passages being freely determinable as long as they open at the flanks or the rake faces of the tip.

Figure 47:
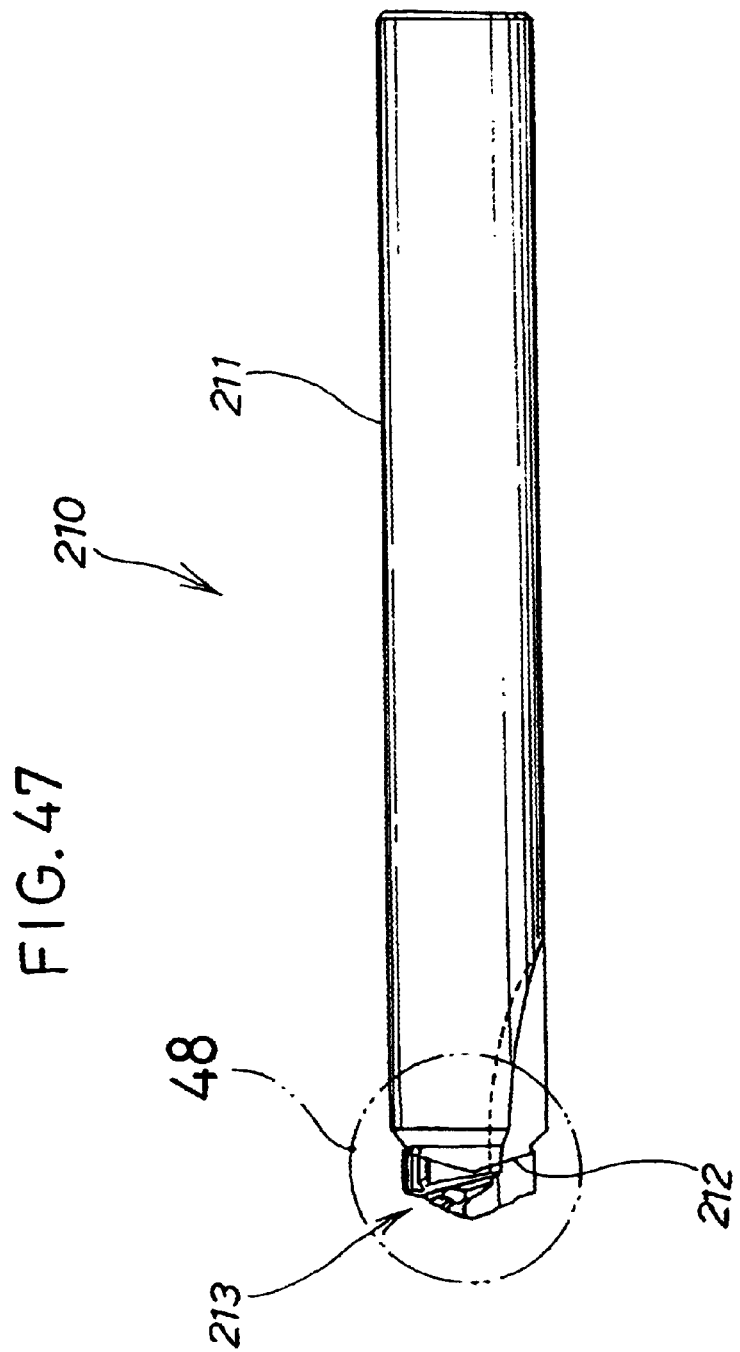
FIG. 47 is a side view of a hole-finishing drill according to the invention.
Figure 48:
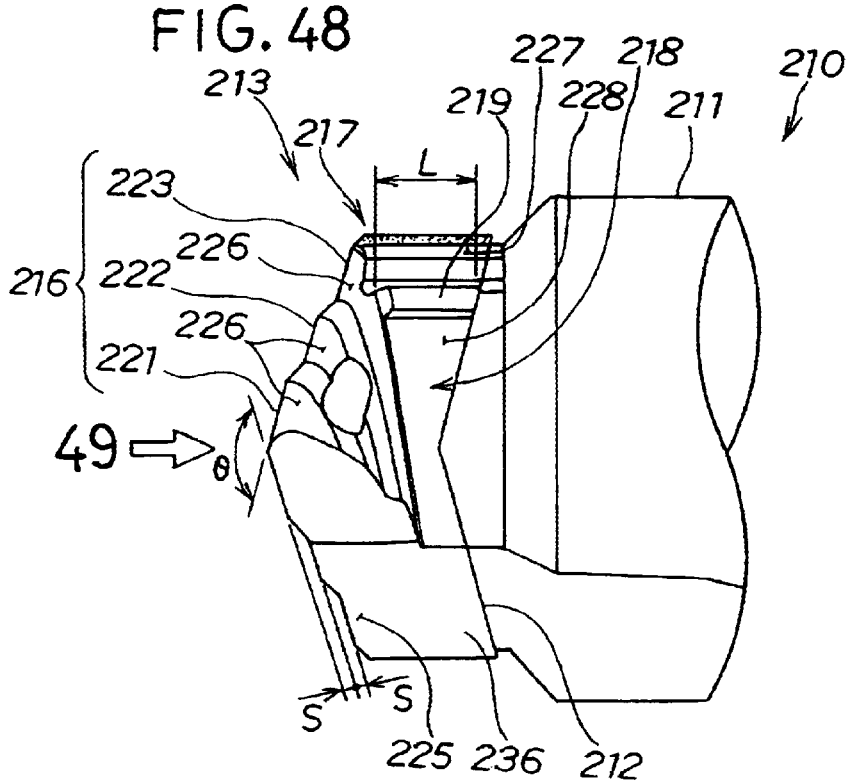
FIG. 48 is an enlarged view of the part 48 in FIG. 47.
Figure 49:
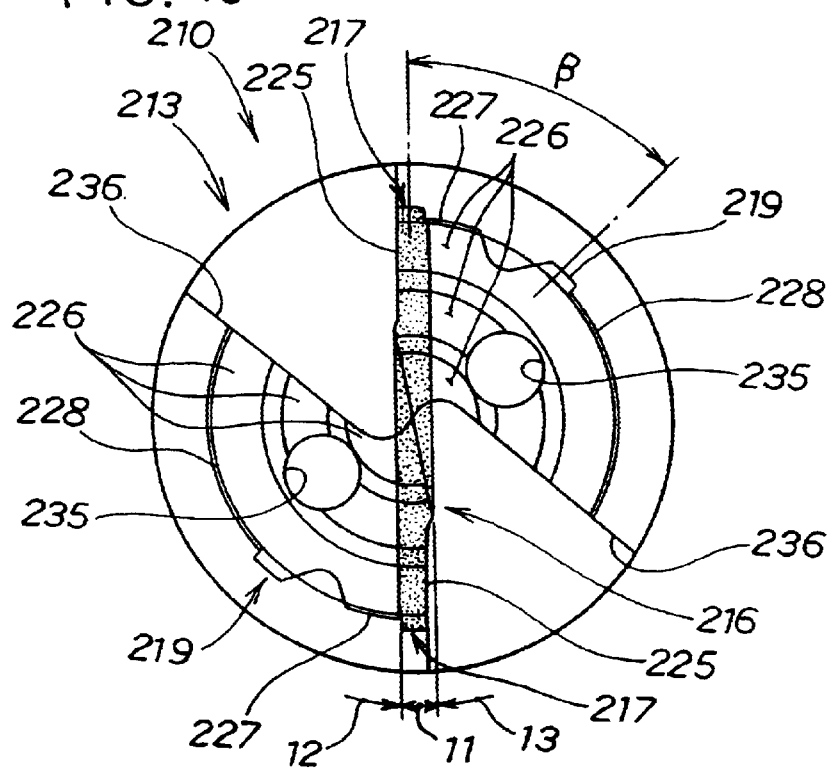
FIG. 49 is a front view of the drill as seen in the direction of the arrow 49 in FIG. 48.

FIGS. 47 through 49 show a hole-finishing drill according to this preferred embodiment. This hole-finishing drill 210 is a cutting tool made by fixing a tip 213 to the end of a shank 211 with brazing filler metal 212.

The shank 211 is a round bar of cemented carbide steel finished to a predetermined diameter, provided with oil passages, and having its end formed into a point. By forming the end into a point like this the accuracy of positioning of the tip 213 can be raised and the strength of its fixing increased.

As shown in FIG. 48 and FIG. 49 cutting edges 216, cutting parts 217, lands 218 and guide pads 219 are formed on the tip 213.

The cutting edges 216 are edges for making a hole in a workpiece, and each is a stopped edge made by forming a first cutting edge 221 at the center of the drill, forming a second cutting edge 222 radially outward from the first cutting edge 221 with a step of a stairway form therebetween, and forming a third cutting edge 223 radially outward from the second cutting edge 222 with a step of a stairway form therebetween. S denotes the step formed between the first cutting edge 221 and the second cutting edge 222 and the step formed between the second cutting edge 222 and the third cutting edge 223. The reference numeral 225 denotes rake faces of the cutting edges 216 and the cutting parts 217, the reference numeral 226 denotes flanks of the cutting edges 216, and θ is the point angle of the cutting edges 216.

The cutting parts 217 are hole-finishing edges, and are formed projecting from the periphery of the tip 213. The reference numeral 227 denotes run offs of the cutting parts 217.

The guide pads 219 are for preventing run out of the tip 213 and are formed projecting from the lands 218 of the tip 213. By the guide pads 219 being formed near the cutting parts 217, they are provided with a length L. The reference numeral 228 denotes run offs of the guide pads 219.

It is shown in FIG. 49 that the guide pads 219 are formed near the cutting parts 217, and specifically with the distance from the cutting parts 217 to the guide pads 219 as a pad angle β. The pad angle β is preferably 45°.

The tip 213 has a structure wherein a second layer 11 is sandwiched between a first layer 12 and a third layer 13 The second layer 11 is a narrow band passing through the center of rotation of the tool, the cutting edges 216 are formed in this narrow band, and the second layer 11 is reinforced on both sides by the first layer 12 and the third layer 13. The reference numerals 235, 235 denote oil passages and the reference numerals 236, 236 denote chip discharge grooves.

For the tip 213, as described above with reference to FIG. 1 and FIGS. 16 through 18, a semi-completed tip is obtained from a three-layer laminate and then this semi-completed tip is brazed to the end of the shank 211 with the brazing filler metal 212. The cutting edges 216, the guide pads 219 and the chip discharge grooves 236 are then formed on the semi-completed tip to complete the hole-finishing drill 210.

Next, action of this hole-finishing drill 210 will be described with reference to FIGS. 50A through 50C and FIG. 51.

Figure 50:
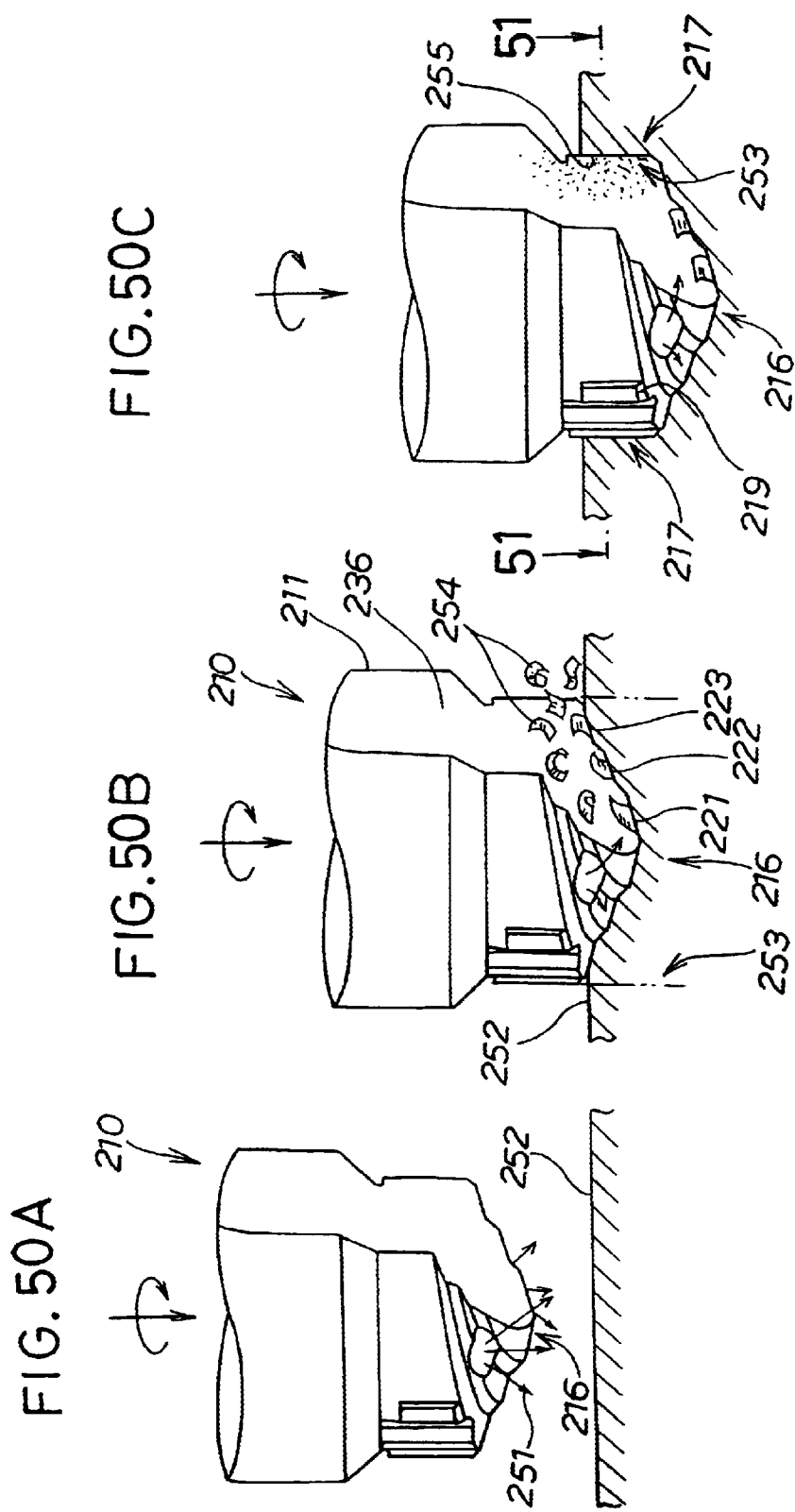
FIGS. 50A, 50B, and 50C are views illustrating an action of the hole-finishing drill when cutting a hole.

In FIG. 50A, with the hole-finishing drill 210 being rotated and cutting oil 251 being supplied, the hole-finishing drill 210 is brought to face a casting 252 and hole-making is started.

In FIG. 50B, the casting 252 is cut with the cutting edges 216 and a hole 253 is formed in the casting 252. Because the cutting edges 216 are each divided into a first cutting edge 221, a second cutting edge 222 and a third cutting edge 223, the lengths of the individual edges are small, and consequently the chips 254 produced are small. When the chips 254 are small, chips can be easily discharged even if the cross-sectional area of the chip discharge grooves 236 is small; consequently, the chip discharge grooves 236 can be made small to secure rigidity of the hole-finishing drill 210. As a result, vibration of the shank 211 occurs less readily and the accuracy of the hole increases.

Because the material of the cutting edges 216 is a hard sintered compact of CBN or diamond, the cutting speed (speed of rotation) of the hole-finishing drill 210 can be increased and productivity can be improved.

In FIG. 50C, following the cutting edges 216, the corners of the cutting parts 217, 217 cut the wall face 255 of the hole 253 slightly, and while the wall face 255 is pressed by the cutting parts 217. 217 the guide pads 219 make contact with the wall face 255, and run out is prevented. Consequently, the wall face 255 of the hole 253 is smooth, the surface roughness of the wall face 255 is low and the dimensional accuracy (dimensional tolerance) of the hole 253 improves.

Because the hole 253 is finished like this as it is made by the hole-finishing drill 210, a hole-making step and a hole-finishing step can be performed in one pass, and the machining time can be shortened. For example, when machining a hole of diameter 10 mm and depth 5 mm under a given condition, a highly accurate hole can be obtained in a machining time of 0.2 seconds (total) in one pass, and the machining time can be cut by 50%.

Also, because the hole is finished with the one hole-finishing drill 210 alone, it is not necessary to use both a drill for making the hole 253 and a reamer for finishing the hole 253, and tool-changing time is thus reduced. For example, when machining a hole of diameter 10 mm and depth 5 mm under a given condition, since there is no tool-changing time, a time of approximately 4 seconds can be saved.

Figure 51:
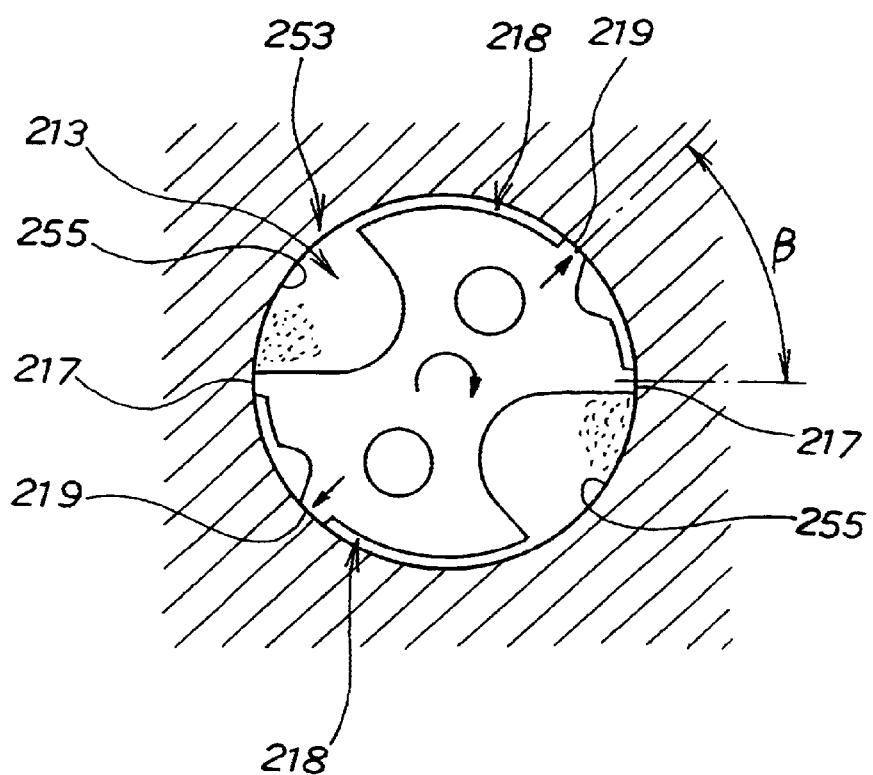
FIG. 51 is a sectional view on the line 51—51 in FIG. 50C.

In FIG. 51, by rotating the cutting parts 217, 217 and the guide pads 219, 219 clockwise in the hole 253 as shown by the central arrow, the wall face 255 of the hole 253 is finished to a high accuracy by the cutting parts 217, 217. That is, when a cutting force acts on the cutting parts 217, the guide pads 219, 219 projecting from the lands 218, 218 make contact with the wall face 255 as shown by the straight arrows, and consequently the axis of the tip 213 does not vibrate largely and accuracy (surface roughness and dimensional tolerance) of the hole 253 is secured.

Also, if the guide pads 219 are formed in positions at a pad angle β as shown in FIG. 49, the surface roughness of the wall face 255 stabilizes and the dimensional accuracy (dimensional tolerance) of the hole 253 stabilizes. If the pad angle β is less than 45°, the guide pads 219 are too close to the cutting parts 217 and the guide pads 219 tend not to make contact with the wall face 255 and run out of the tip 213 tends to occur. If the pad angle β is 45°, run out of the tip 213 can be prevented. If the pad angle β exceeds 4520 , the guide pads 219 are too far from the cutting parts 217 and even if the guide pads 219 make contact with the wall face 255 they can less easily stop run out of the tip 213.

Next, an example of a test of the pad angle β will be described.

Figure 52A:
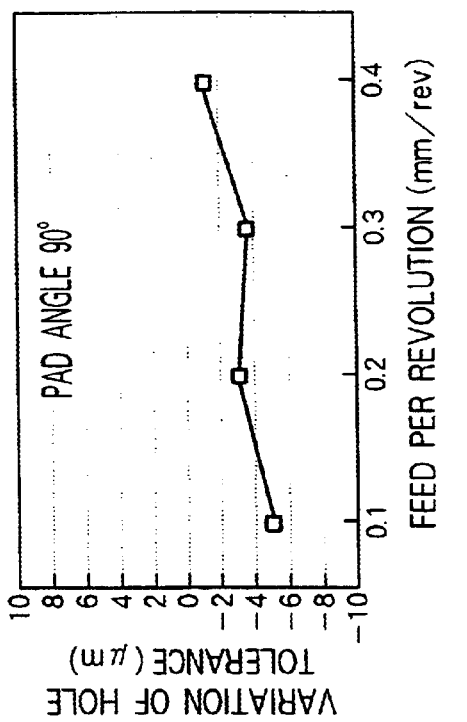
FIGS. 52A, 52B, 52C, and 52D are graphs comparing results obtained with different pad angles 45° and 90°.
Figure 52B:
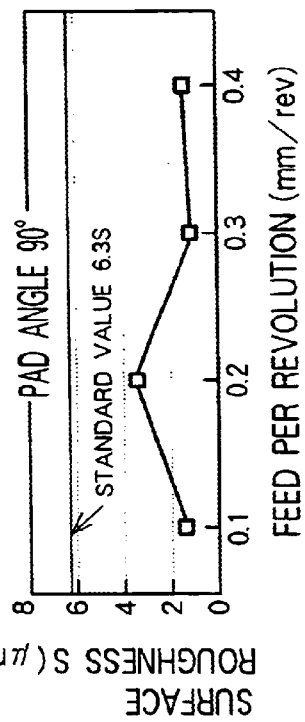
Figure 52C:
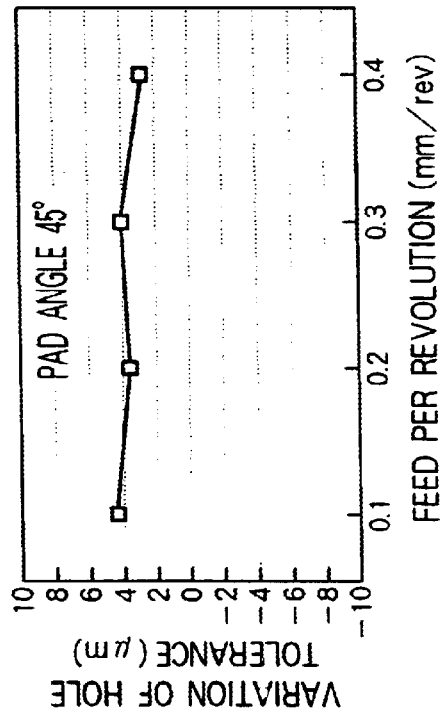
Figure 52D:
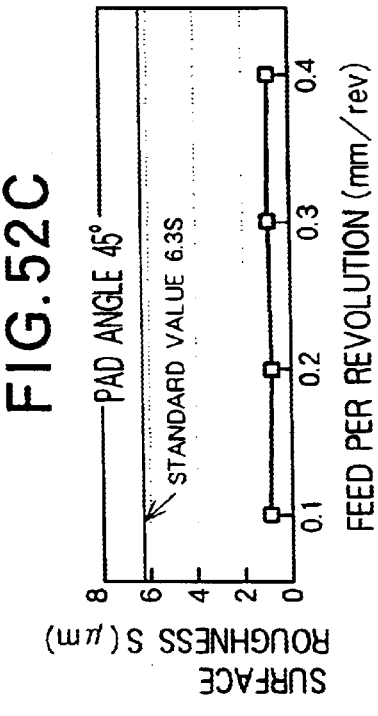

FIGS. 52A through 52D are graphs comparing the case of pad angle=45° with the case of pad angle=90°. In FIG. 52A and FIG. 52B the horizontal axis shows feed per revolution and the vertical axis shows variation of tolerance of the hole. In FIG. 52C and FIG. 52D the horizontal axis shows feed per revolution and the vertical axis shows surface roughness.

FIG. 52A: In the case of pad angle 45°, the variation of tolerance of the hole is substantially constant with respect to increasing feed rate, and thus the dimensions of the hole are stable.

FIG. 52B; In the case of pad angle 90°, the variation of tolerance of the hole decreases in proportion with increasing feed rate, and thus dispersion arises in the dimensions of the hole.

FIG. 52C: In the case of pad angle 45°, the surface roughness is constant with respect to increasing feed rate, and thus the surface roughness is stable.

FIG. 52D: In the case of pad angle 90°, the surface roughness may increase with varying feed rate.

In this preferred embodiment, an example wherein three steps are formed in each of the cutting edges 216, as illustrated in FIG. 47, has been shown; however, in the invention the number of steps is not limited to three, and the number of steps may be varied in accordance with the size of the hole diameter.

Also, although the number of guide pads 219 shown in FIG. 49 is two, the number is not limited to two. And similarly, the number of cutting edges 216 and the number of cutting parts 217 can be determined freely.

As described above, in this preferred embodiment, because each cutting edge of a hole-finishing drill is made a stepped edge having a plurality of steps in the form of a stairway radially outward from the center of the drill, chips can be broken up finely. And because of this, the chip discharge grooves can be made small and the rigidity of the drill can be increased.

Also, because guide pads for preventing run out of the tip are formed projecting from lands of the drill, the guide pads make contact with the wall of the hole and the tip does not vibrate during cutting. Consequently, the wall of the hole can be finished to a high accuracy.

Thus while making a hole it is possible to perform finishing of the hole as well.

Next, another preferred embodiment of a cutting tool for thread-cutting, shown in FIGS. 53 through 56, will be described. In FIG. 53, a cutting tool 310 of this preferred embodiment is made up of a tip 313 fixed to the end of a shank 311 with brazing filler metal 312. The shank 311 is a round bar of tool steel finished to a predetermined diameter, provided with oil passages, and having its end formed into a point. By forming the end into a point like this the accuracy of positioning of the tip 313 can be raised and, because the fixing area increases, the strength of its fixing increased.

Figure 54:
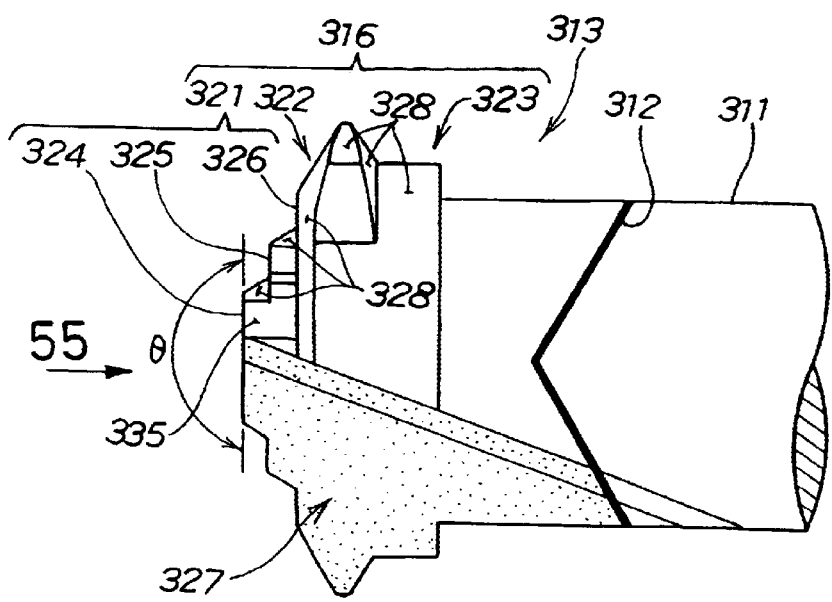
FIG. 54 is an enlarged view of the part 54 in FIG. 53.
Figure 55:
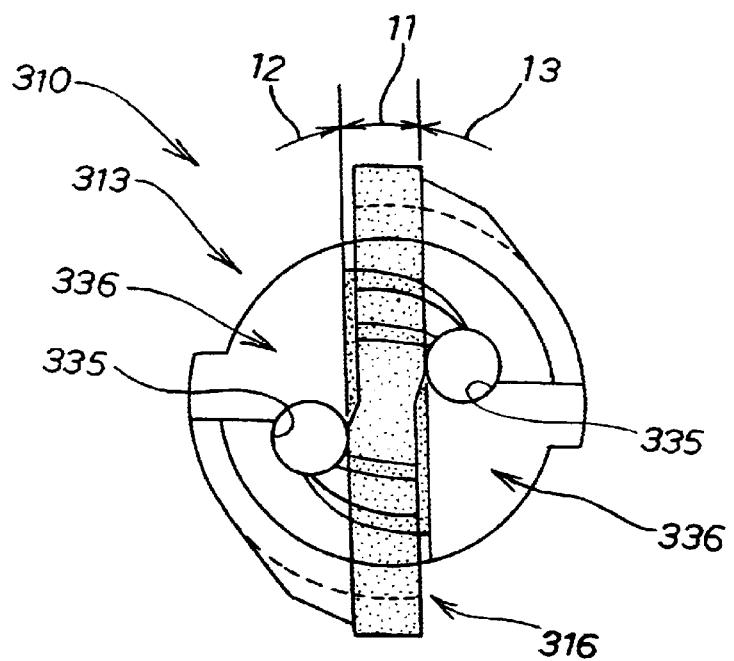
FIG. 55 is a front view of the cutting tool as seen in the direction of the arrow 55 in FIG. 54.
Figure 56:
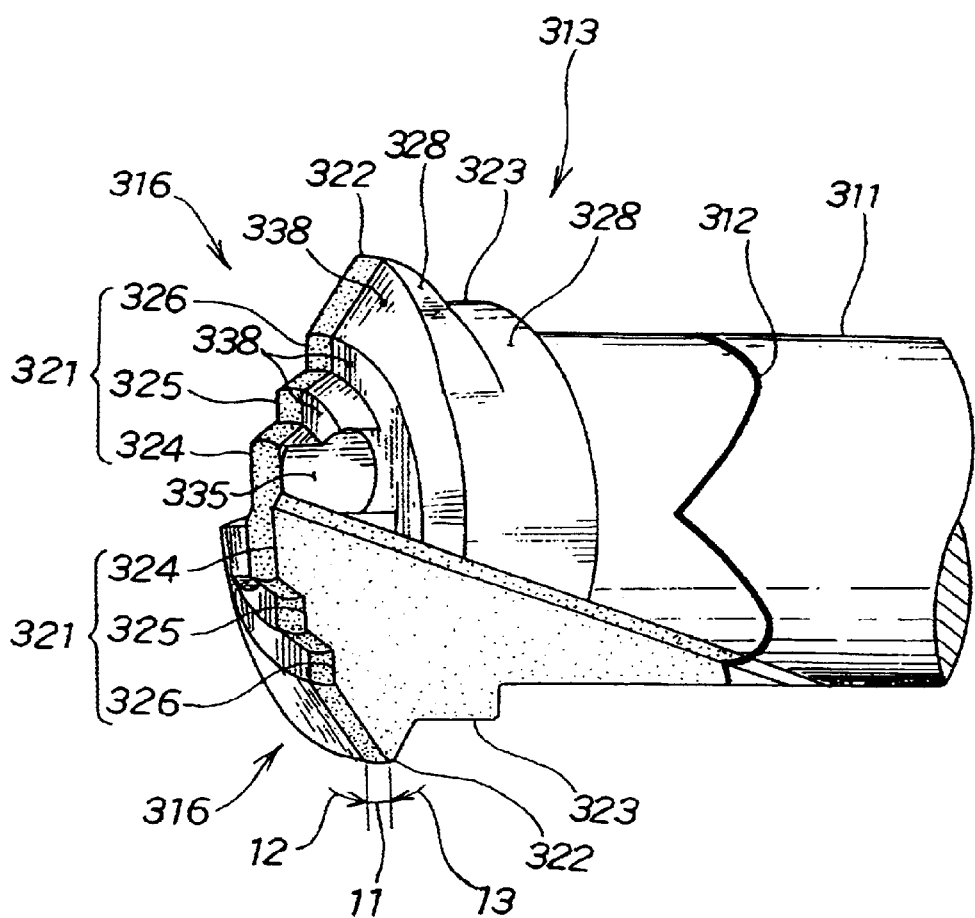
FIG. 56 is a perspective view showing details of the shape of the tip shown in FIG. 54.

The structure of the tip 313 is shown in detail in FIGS. 54 through 56.

Each cutting edge 316 formed on the tip 313 has an end cutting edge 321, a thread-cutting edge 322 and a flat drag 323. The end cutting edge 321 has a first end cutting edge 324 formed on the end of the tip 313, a second end cutting edge 325 formed from the first end cutting edge 324 toward the shank 311, and a third end cutting edge 326 formed from the second end cutting edge 325 further toward the shank. The thread-cutting edge 322 is formed continuing from the third end cutting edge 326 toward the shank. The flat drag 323 is formed continuing from the thread-cutting edge 322 further toward the shank. The reference numeral 327 denotes a rake face and 328 a side flank. θ is the tip angle of the cutting edges 316 and is 180°.

In FIG. 55, the tip 313 consists of a three-layer laminate wherein a second layer 11 made of a hard sintered compact of CBN or diamond is sandwiched between a first layer 12 and a third layer 13 made of a tool material such as cemented carbide. When the cutting tool 310 is seen from the front, the second layer 11 is a narrow band passing through the center of rotation of the tool, the cutting edges 316 are formed in this narrow band, and the second layer 11 is reinforced on both sides by the first layer 12 and the third layer 13. The reference numerals 335, 335 denote oil passages and 336, 336 denote chip discharge grooves.

For the tip 313, with reference to FIG. 1 and FIGS. 16 through 18, a semi-completed tip is obtained from a three-layer laminate and then this semi-completed tip is brazed to the end of the shank 311 with the brazing filler metal brazing filler metal 312. The cutting edges 316 each made up of an end cutting edge 321, a thread-cutting edge 322 and a flat drag 323 are then formed on the semi-completed tip 316 to complete a cutting tool 310 for thread-cutting.

As is clear from the detail view of FIG. 56, in the cutting edges 316, 316, first end cutting edges 324, 324, second end cutting edges 325, 325 and third end cutting edges 326, 326 continuous in the form of a stairway, for generating chips finely, are formed; thread-cutting edges 322, 322 for cutting a thread are formed; and flat drags 323, 323 of the same diameter as the internal diameter of the female thread are formed. The reference numeral 338 denotes front flanks.

Next, an operation for cutting a thread using the thread-cutting tool shown in the preferred embodiment of FIGS. 54 through 56 will be described.

FIGS. 57A through 57D show a case wherein a cored hole 342 has been provided in a casting 341 in advance. Forming a cored hole 342 in advance like this promotes efficiency of machining.

FIG. 57A: The cutting tool 310 is brought to face the casting 341 and, first, machining of a chamfer on the cored hole 342 is started.

FIG. 57B: With the cutting tool 310 rotating, the center axis 344 of the cutting tool 310 is offset by a distance δ1 from the hole center 343. The entrance of the cored hole 342 is cut by the end cutting edges 321 and the thread-cutting edges 322, and a chamfer 345 is formed.

FIG. 57C: A prepared hole 346 is formed by the end cutting edge 321 and the thread-cutting edge 322. The internal diameter of the prepared hole 346 is substantially the same as the diameter of the thread-cutting edges 322. Because the first end cutting edges 324, the second end cutting edges 325 and the third end cutting edges 326 for making the chips 347 small are formed in the cutting edges 316, even if the area of the chip discharge grooves 336 are made small, chips 347 can be discharged easily. And by making the area of the chip discharge grooves 336 small like this, it is possible to raise the rigidity of the cutting tool 310. When the rigidity of the tool is high, an efficient cutting condition can be set, and productivity can be increased. When a predetermined depth is reached, feeding (lowering) of the cutting tool 310 is stopped and thread-cutting is started.

FIG. 57D: With the cutting tool 310 rotating about its own axis, the cutting tool 310 is revolved to effect thread-cutting. Thread-cutting is carried out in the form of a spiral so that the tool advances by a pitch P with each revolution. When thread-cutting ends, the cutting tool 310 is removed and a female thread 348 is obtained. When the cutting tool 310 is removed from the threaded hole, because the chamfer 345 has already been formed, there is no burring at the entrance 351 of the threaded hole, and the labor of removing burrs can be dispensed with. Also, because the flat drags 323 the same diameter as the internal diameter of the female thread are formed on the cutting edges 316, a crest of the ridge of the female thread having a predetermined internal diameter can be formed with the flat drags 323.

In this way it is possible to carry out formation of a chamfer, formation of a prepared hole, thread-cutting and formation of a thread ridge crest with the single cutting tool 310. Consequently, there is no need for a tool change and cutting work can be carried out continuously, without stopping.

FIGS. 58A through 58D show a process for cutting a thread in a casting 361 which does not have a cored hole.

FIG. 58A: The cutting tool 310 is brought to face the casting 361, and machining of a chamfer is started.

FIG. 58B: The machining of the chamfer is the same as described with reference to FIG. 57B. That is, the center axis 344 of the cutting tool 310 is offset by a distance δ1 and a chamfer 345 is formed by the end cutting edges 321 and the thread-cutting edges 322.

FIG. 58C: Next, the cutting tool 310 is lowered and machining of a prepared hole is carried out. The prepared hole machining is the same as described with reference to FIG. 56C. Because the first end cutting edges 324, the second end cutting edges 325 and the third end cutting edges 326 for making the chips 347 small are formed in the cutting edges 316, even if the area of the chip discharge grooves 336 are made small, chips 347 can be discharged easily. When the cutting tool 310 reaches a predetermined depth, feeding (lowering) of the cutting tool 310 is stopped and thread-cutting is started.

FIG. 58D: Thread-cutting also is the same as described with reference to FIG. 57D. That is, thread-cutting is effected by means of the thread-cutting edges 322 while the cutting tool 310 is lifted from the bottom of the prepared hole, and a female thread 348 is formed.

Thus, even without a cored hole in the casting, in the same way as when there is a cored hole, the machining of a chamfer the formation of a prepared hole and thread-cutting can be carried out with the single cutting tool 310, and consequently the labor of changing tools is eliminated and productivity is increased.

Although in this preferred embodiment an example was used wherein the point angle θ of the cutting edges 316 is 180°, as shown in FIG. 54, in the invention there is no limitation to this, and the point angle θ can be determined freely.

What is claimed is:

1. A cutting tip having an axis, comprising:
   a first layer consisting of a cemented carbide tool material;
   a second layer consisting of a hard sintered compact of CBN or diamond; and
   a third layer consisting of a cemented carbide tool material,
   wherein the second layer is sandwiched between the first layer and the third layer to form a three-layer laminate, the second layer extends over the entire length of the cutting tip in a direction of the axis of the cutting tip, and a cutting edge is formed in the second layer.

2. A cutting tool made up of a shank and a tip attached to the shank, the tip having a length extending in a direction of the axis of the cutting tool, wherein:
   the tip is made from a three-layer laminate wherein a second layer consisting of a hard sintered compact of CBN or diamond is sandwiched by a first layer and a third layer consisting of cemented carbide; and
   when the cutting tool is seen in front view, the second layer is a narrow band passing through the center of rotation of the tool and extending over the entire length of the tip, at least one cutting edge is formed in this narrow band, and the second layer is reinforced on opposite sides by the first layer and the third layer.

3. The cutting tool according to claim 2, wherein said at least one cutting edge comprises
   an end cutting edge constructed in the form of a stairway to keep chips small, a thread-cutting edge for cutting a thread, and a flat drag of the same diameter as the internal diameter of the female thread, said end cutting edge, said thread-cutting edge and said flat drag being arranged in the order named from the end of the tip toward the shank.

4. The cutting tool according to claim 2, wherein an oil passage is formed in the shank and an oil passage is formed in the second layer of the tip and the two oil passages connect in a straight line.

5. The cutting tool according to claim 2, wherein said cutting tool is a hole-finishing drill and said at least one cutting edge comprises a stepped edge formed with a plurality of steps in the form of a stairway radially outward from the drill center, said cutting tool further including a pair of lands formed on the periphery of the tip and guide pads projecting on the lands of the drill for preventing run out of the tip.

6. The cutting tool according to claim 2, wherein said cutting tool is a thread-cutting tool and said at least one cutting edge comprises a drill edge and a thread-cutting edge formed in said narrow band.

7. The cutting tool according to claim 6, wherein at least two oil passages are provided in the shank and at least one oil passage is provided in each of the first layer and the third layer of the tip so that the oil passages in the shank and the oil passages in the tip connect.

8. The cutting tool according to claim 2, wherein said cutting tool is a thread-cutting tool, and said at least one cutting edge comprises an end cutting edge and a thread-cutting edge formed in said narrow band.

9. The cutting tool according to claim 8, wherein an oil passage is formed in the shank and an oil passage is formed in the second layer of the tip and the two oil passages connect in a straight line.

10. The cutting tool according to claim 9, wherein a flat drag of smaller diameter than the thread-cutting edge and large diameter than the shank is formed on the side of the tip attached to the shank, and the flat drag is located axially behind the thread-cutting edge.

* * * * *